United States Patent [19]
Hattori

[11] Patent Number: 5,135,444
[45] Date of Patent: Aug. 4, 1992

[54] PLANETARY GEAR SYSTEM

[75] Inventor: Noboru Hattori, Yokosuka, Japan

[73] Assignee: Nissan Motor Co., Ltd., Yokohama, Japan

[21] Appl. No.: 815,617

[22] Filed: Jan. 7, 1992

Related U.S. Application Data

[63] Continuation of Ser. No. 482,976, Feb. 22, 1990, abandoned.

[30] Foreign Application Priority Data

| Feb. 28, 1989 | [JP] | Japan | 1-47794 |
| Feb. 28, 1989 | [JP] | Japan | 1-47795 |
| Feb. 28, 1989 | [JP] | Japan | 1-47796 |
| Feb. 28, 1989 | [JP] | Japan | 1-47797 |

[51] Int. Cl.$^5$ ............................................ F16H 57/10
[52] U.S. Cl. ............................................ 475/285; 475/289
[58] Field of Search .......... 475/278, 284, 285, 288, 475/289

[56] References Cited

U.S. PATENT DOCUMENTS

| 2,220,174 | 11/1940 | Ravigneaux | 74/268 |
| 2,631,476 | 3/1953 | Ravigneaux | 74/759 |
| 2,761,333 | 9/1956 | Ravigneaux | 74/759 |
| 2,827,805 | 3/1958 | Miller | 74/761 |
| 2,847,877 | 8/1958 | Ravigneaux | 74/759 |
| 2,871,726 | 2/1959 | Kamlukin | 74/769 |
| 2,873,625 | 2/1959 | Simpson | 74/763 |
| 2,901,923 | 9/1959 | Waclawek | 74/688 |
| 3,106,107 | 10/1963 | Hardy | 475/284 X |
| 3,299,746 | 1/1967 | Konrad | 74/758 |
| 3,597,999 | 8/1971 | Fisher | 475/289 X |
| 3,763,719 | 10/1973 | Malloy | 74/761 |
| 3,853,023 | 12/1974 | Mori et al. | 74/759 |
| 3,946,624 | 3/1976 | Murakami et al. | 475/284 |
| 3,971,267 | 7/1976 | Murakami et al. | 74/759 |
| 3,979,974 | 9/1976 | Murakami | 74/759 |
| 3,987,690 | 10/1976 | Murakami et al. | 74/759 |
| 3,999,448 | 12/1976 | Murakami et al. | 74/759 |
| 4,004,473 | 1/1977 | Pearce et al. | 74/759 |
| 4,038,887 | 8/1977 | Murakami et al. | 74/769 |
| 4,345,490 | 8/1982 | Madson | 475/277 |
| 4,417,484 | 11/1983 | Gaus et al. | 74/688 |
| 4,638,688 | 1/1987 | Hiraiwa | 74/763 |
| 4,653,347 | 3/1987 | Hiraiwa | 74/759 |
| 4,653,348 | 3/1987 | Hiraiwa | 74/759 |
| 4,660,439 | 4/1987 | Hiraiwa | 74/763 |
| 4,802,385 | 2/1989 | Hiraiwa | 74/758 |
| 4,843,909 | 7/1989 | Hasegawa et al. | 74/752 C |
| 4,884,472 | 12/1989 | Miura et al. | 475/285 |
| 4,892,011 | 1/1990 | Nishida et al. | 475/285 X |

FOREIGN PATENT DOCUMENTS

| 3822319 | 1/1989 | Fed. Rep. of Germany. |
| 50-64660 | 5/1975 | Japan. |
| 52-149562 | 12/1977 | Japan. |
| 61-117950 | 7/1986 | Japan. |
| 61-502274 | 10/1986 | Japan. |
| 63-88353 | 4/1988 | Japan. |

Primary Examiner—Rodney H. Bonck
Assistant Examiner—Ryan W. Massey
Attorney, Agent, or Firm—Foley & Lardner

[57] ABSTRACT

A planetary gear system has a first planetary gear set including a first ring gear, a first sun gear and a first planet carrier, and a second planetary gear set including a second ring gear, a second sun gear and a second planet carrier. The first and second carriers are integrated into a common carrier, and at least one long pinion is provided between the first and second planetary gear sets so as to form a third equivalent planetary gear set with the first and second ring gears. This gear system can provide at least six forward speeds, and one or two reverse speeds with a compact arrangement.

65 Claims, 29 Drawing Sheets

|  | C1 | C2 | C3 | B1 | B2 | B3 |
|---|---|---|---|---|---|---|
| REVERSE 2ND | ◯ |  |  |  | ◯ |  |
| REVERSE 1ST | ◯ |  |  |  |  | ◯ |
| NEUTRAL |  |  |  |  |  | ◯ |
| FORWARD 1ST |  |  | ◯ |  |  | ◯ |
| FORWARD 2ND |  |  | ◯ |  | ◯ |  |
| FORWARD 3RD |  |  | ◯ | ◯ |  |  |
| FORWARD 4TH |  | ◯ | ◯ |  |  |  |
| FORWARD 5TH |  | ◯ |  | ◯ |  |  |
| FORWARD 6TH |  | ◯ |  |  | ◯ |  |

FIG. 6

| | CLUTCH | | BRAKE | | | GEAR RATIO |
|---|---|---|---|---|---|---|
| | C1 | C2 | B1 | B2 | B3 | |
| REVERSE | ○ | | | ○ | | $\dfrac{\alpha_1 k - 1}{\alpha_1 (k-1)}$ |
| NEUTRAL | | | | ○ | | |
| FORWARD 1ST | | ○ | | ○ | | $\dfrac{k}{k-1}$ |
| FORWARD 2ND | | ○ | ○ | | | $\dfrac{1}{1-\alpha_1}$ |
| FORWARD 3RD | | ○ | | | ○ | $\dfrac{k}{k-\alpha_2}$ |
| FORWARD 4TH | ○ | ○ | | | | 1.000 |
| FORWARD 5TH | ○ | | | | ○ | $\dfrac{\alpha_1 k - \alpha_2}{\alpha_1 (k-\alpha_2)}$ |

$$\alpha_1 = \frac{Z_{s1}}{Z_{r1}} \qquad \alpha_2 = \frac{Z_{s2}}{Z_{r2}} \qquad k = \frac{Z_{r1} \cdot Z_{p2}}{Z_{r2} \cdot Z_{p1}}$$

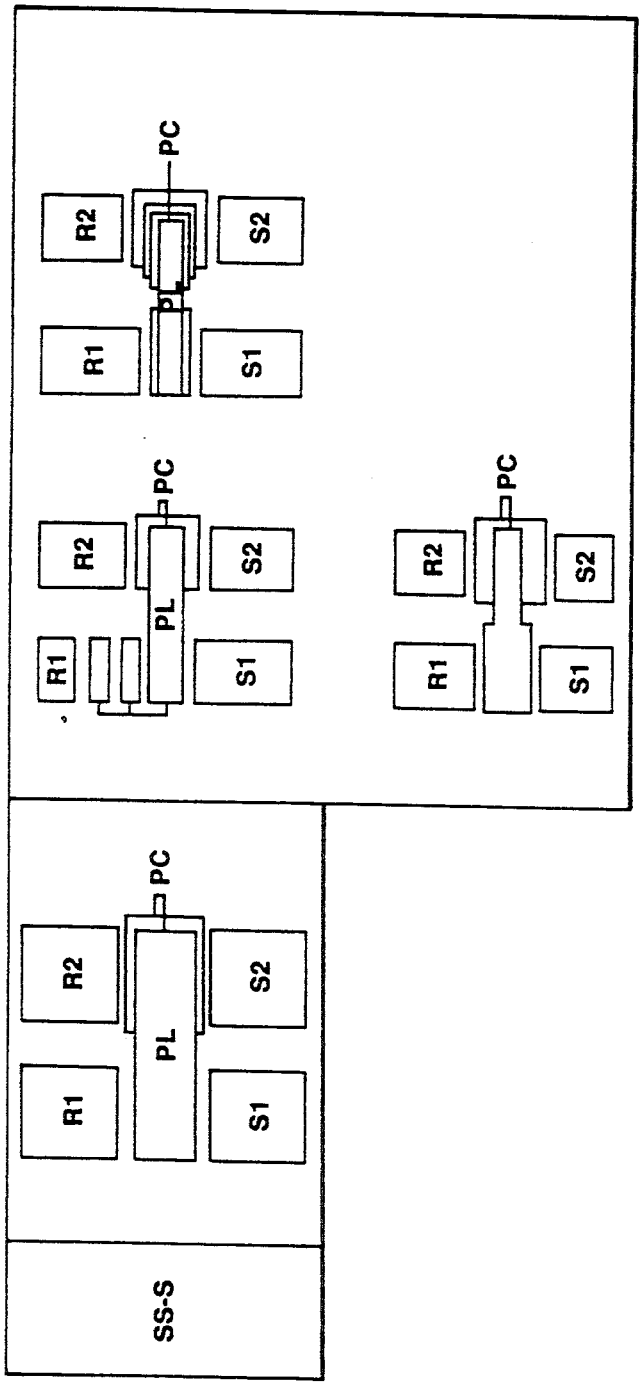
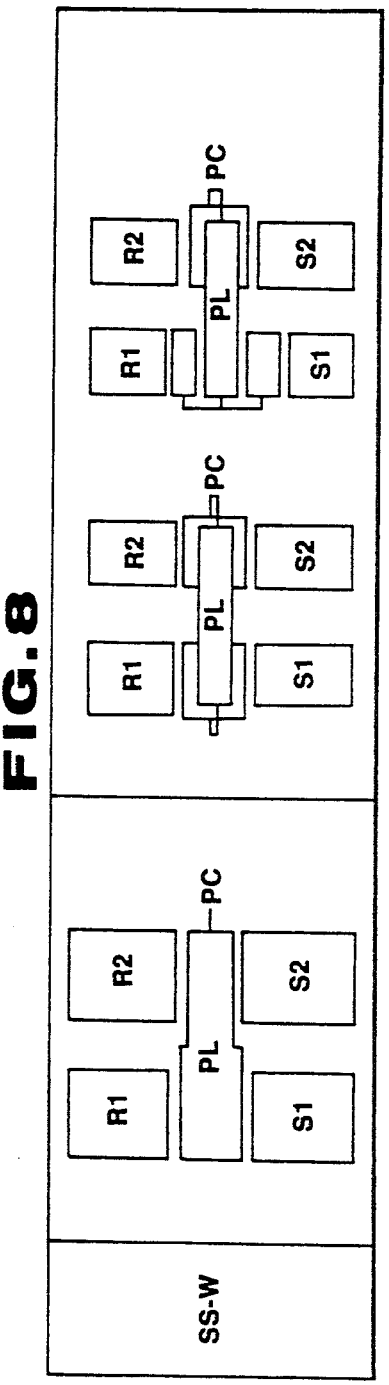
FIG.7
FIG.8

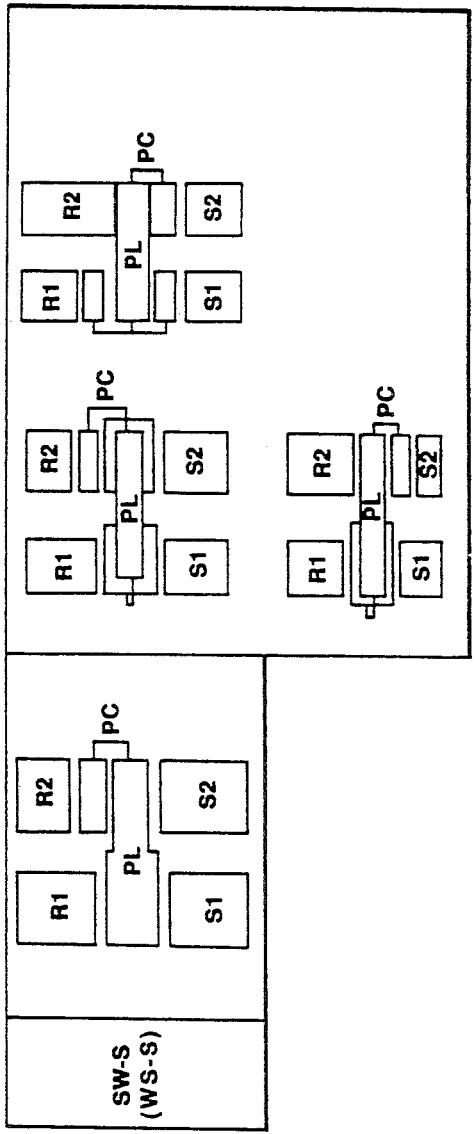
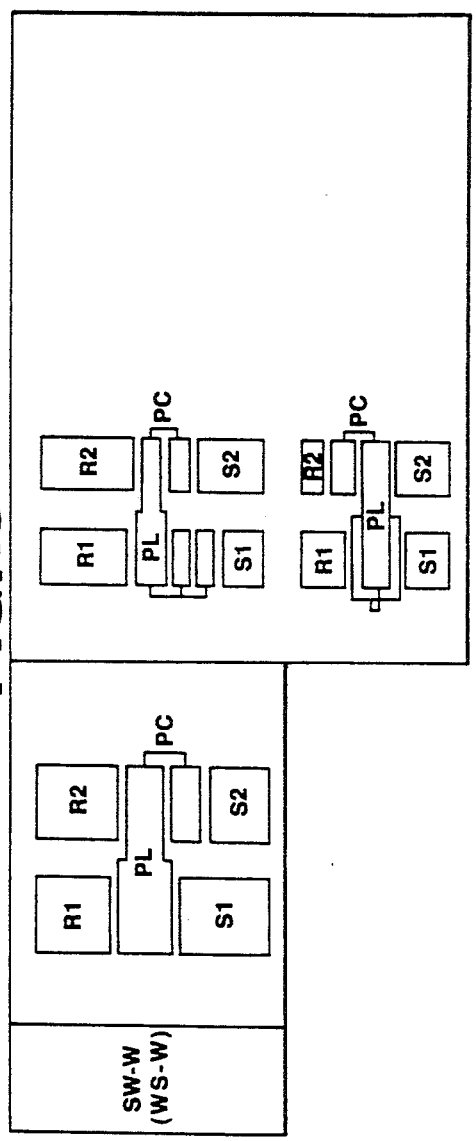

| | C1 | C2 | C3 | B1 | B2 | B3 | GEAR RATIO |
|---|---|---|---|---|---|---|---|
| -2 | | | ○ | ○ | | | $-\dfrac{k}{\alpha_2}$ |
| -1 | ○ | | | ○ | | | $-\dfrac{1}{\alpha_1}$ |
| 0 | | | | | ○ | | |
| 1 | | | ○ | | ○ | | $\dfrac{k(1+\alpha_2)}{\alpha_2 k - 1}$ |
| 2 | ○ | | | | ○ | | $\dfrac{\alpha_1 k + 1}{\alpha_1(k-1)}$ |
| 3 | | ○ | | | ○ | | $\dfrac{k}{k-\alpha_2}$ |
| 4 | ○ | ○ | | | | | 1.00 |
| 5 | | ○ | | | | ○ | $\dfrac{k}{k+\alpha_2}$ |

| | CLUTCH | | | BRAKE | | | GEAR RATIO |
|---|---|---|---|---|---|---|---|
| | C1 | C2 | C3 | B1 | B2 | B3 | |
| -1 | ○ | | | | | ○ | $-\dfrac{1}{\alpha_1 k}$ |
| 0 | | | | ○ | | | |
| 1 | | | ○ | ○ | | | $\dfrac{\alpha_2-k}{\alpha_2(k-1)}$ |
| 2 | | | ○ | | ○ | | $\dfrac{1}{\alpha_2}$ |
| 3 | | | ○ | | | ○ | $\dfrac{\alpha_2+\alpha_1 k}{\alpha_2(1-k)}$ |
| 4 | | ○ | ○ | | | | 1.00 |
| 5 | | ○ | | | | ○ | $\dfrac{1}{1+\alpha_1 k}$ |

|   | C1 | C2 | C3 | B1 | B2 | B3 | GEAR RATIO |
|---|----|----|----|----|----|----|------------|
| -2 |    |    | ◯  | ◯  |    |    | $-\dfrac{k}{\alpha_2}$ |
| -1 |    |    | ◯  |    | ◯  |    | $\dfrac{k(\alpha_2-1)}{\alpha_2 k+1}$ |
| 0 |    |    |    | ◯  |    |    |  |
| 1 | ◯  |    |    | ◯  |    |    | $\dfrac{1}{\alpha_1}$ |
| 2 | ◯  |    |    |    | ◯  |    | $\dfrac{\alpha_1 k+1}{\alpha_1(k+1)}$ |
| 3 | ◯  |    |    |    |    | ◯  | $\dfrac{\alpha_1 k+\alpha_2}{\alpha_1(k+\alpha_2)}$ |
| 4 | ◯  | ◯  |    |    |    |    | 1.00 |
| 5 |    | ◯  |    |    |    | ◯  | $-\dfrac{k}{k+\alpha_2}$ |

| | C1 | C2 | C3 | B1 | B2 | B3 | GEAR RATIO |
|---|---|---|---|---|---|---|---|
| -2 | | ○ | | | | ○ | $\dfrac{k}{k-\alpha_2}$ |
| -1 | | ○ | | | ○ | | $\dfrac{k}{k-1}$ |
| 0 | | | | | | ○ | |
| 1 | ○ | | | | | ○ | $\dfrac{\alpha_1 k - \alpha_2}{\alpha_1(k-\alpha_2)}$ |
| 2 | ○ | | | | ○ | | $\dfrac{\alpha_1 k - 1}{\alpha_1(k-1)}$ |
| 3 | ○ | | | ○ | | | $\dfrac{1}{\alpha_1}$ |
| 4 | ○ | | ○ | | | | 1.00 |
| 5 | | | ○ | ○ | | | $\dfrac{k}{\alpha_2}$ |

| | C1 | C2 | C3 | B1 | B2 | B3 | GEAR RATIO |
|---|---|---|---|---|---|---|---|
| -1 | | | ◯ | | ◯ | | $\frac{k(1-\alpha_2)}{\alpha_2(1-k)}$ |
| 0 | | | | | ◯ | | |
| 1 | ◯ | | | | ◯ | | $\frac{k}{k-1}$ |
| 2 | ◯ | | | ◯ | | | $\frac{1}{1-\alpha_1}$ |
| 3 | ◯ | | | | | ◯ | $\frac{k}{k-\alpha_2}$ |
| 4 | ◯ | ◯ | | | | | 1.00 |
| 5 | | ◯ | | | | ◯ | $\frac{k(1-\alpha_2)}{k-\alpha_2}$ |
| (6) | | ◯ | | ◯ | | | $\frac{1-\alpha_1 k}{1-\alpha_1}$ |

| | CLUTCH | | | BRAKE | | | GEAR RATIO |
|---|---|---|---|---|---|---|---|
| | C1 | C2 | C3 | B1 | B2 | B3 | |
| -1 | | | ○ | ○ | | | $\dfrac{\alpha_2 - \alpha_1 k}{\alpha_2 (1-\alpha_1)}$ |
| 0 | | | | ○ | | | |
| 1 | ○ | | | ○ | | | $\dfrac{k}{k-1}$ |
| 2 | ○ | | | | ○ | | $\dfrac{1}{1-\alpha_1}$ |
| 3 | ○ | | | | | ○ | $\dfrac{k}{k-\alpha_2}$ |
| 4 | ○ | ○ | | | | | 1.000 |
| 5 | | ○ | | | | ○ | $\dfrac{k(1-\alpha_2)}{k-\alpha_2}$ |

| | CLUTCH | | | BRAKE | | | GEAR RATIO |
|---|---|---|---|---|---|---|---|
| | C1 | C2 | | B1 | B2 | B3 | |
| -1 | ○ | | | | ○ | | $\dfrac{\alpha_1 k - 1}{\alpha_1 (k-1)}$ |
| 0 | | | | | ○ | | |
| 1 | | ○ | | | ○ | | $\dfrac{k}{k-1}$ |
| 2 | | ○ | | ○ | | | $\dfrac{1}{1-\alpha_1}$ |
| 3 | | ○ | | | | ○ | $\dfrac{k}{k-\alpha_2}$ |
| 4 | ○ | ○ | | | | | 1.000 |
| 5 | ○ | | | | | ○ | $\dfrac{\alpha_1 k - \alpha_2}{\alpha_1 (k-\alpha_2)}$ |

| | CLUTCH | | | BRAKE | | | GEAR RATIO |
|---|---|---|---|---|---|---|---|
| | C1 | C2 | C3 | B1 | B2 | B3 | |
| -1 | | | ○ | | ○ | | $\dfrac{k(1-\alpha 2)}{\alpha 2(1-k)}$ |
| 0 | | | | | ○ | | |
| 1 | ○ | | | | ○ | | $\dfrac{k}{k-1}$ |
| 2 | ○ | | | ○ | | | $\dfrac{1}{1-\alpha 1}$ |
| 3 | ○ | | | | | ○ | $\dfrac{k}{k-\alpha 2}$ |
| 4 | ○ | ○ | | | | | 1.000 |
| 5 | | ○ | | | | ○ | $\dfrac{k(1-\alpha 2)}{k-\alpha 2}$ |

FIG. 29

| | | |
|---|---|---|
| SS-S | | |
| SS-W | | |
| SW-S (WS-S) | | |
| SW-W (WS-W) | | |
| WW-S | | |
| WW-W | | |

| | C1 | C2 | C3 | B1 | B2 | B3 | GEAR RATIO |
|---|---|---|---|---|---|---|---|
| REVERSE | | | ○ | | ○ | | $-\dfrac{k}{\alpha_2}$ |
| NEUTRAL | | | ○ | | | | |
| FORWARD 1ST | | | ○ | ○ | | | $\dfrac{\alpha_1 k + \alpha_2}{\alpha_2(1-\alpha_1)}$ |
| FORWARD 2ND | | ○ | | ○ | | | $\dfrac{1+\alpha_1 k}{1-\alpha_1}$ |
| FORWARD 3RD | ○ | | | ○ | | | $\dfrac{1}{1-\alpha_1}$ |
| FORWARD 4TH | ○ | ○ | | | | | 1.00 |
| FORWARD 5TH | ○ | | | | | ○ | $\dfrac{k}{k+\alpha_2}$ |
| FORWARD 6TH | | ○ | | | | ○ | $\dfrac{k(1-\alpha_2)}{k+\alpha_2}$ |

FIG.40

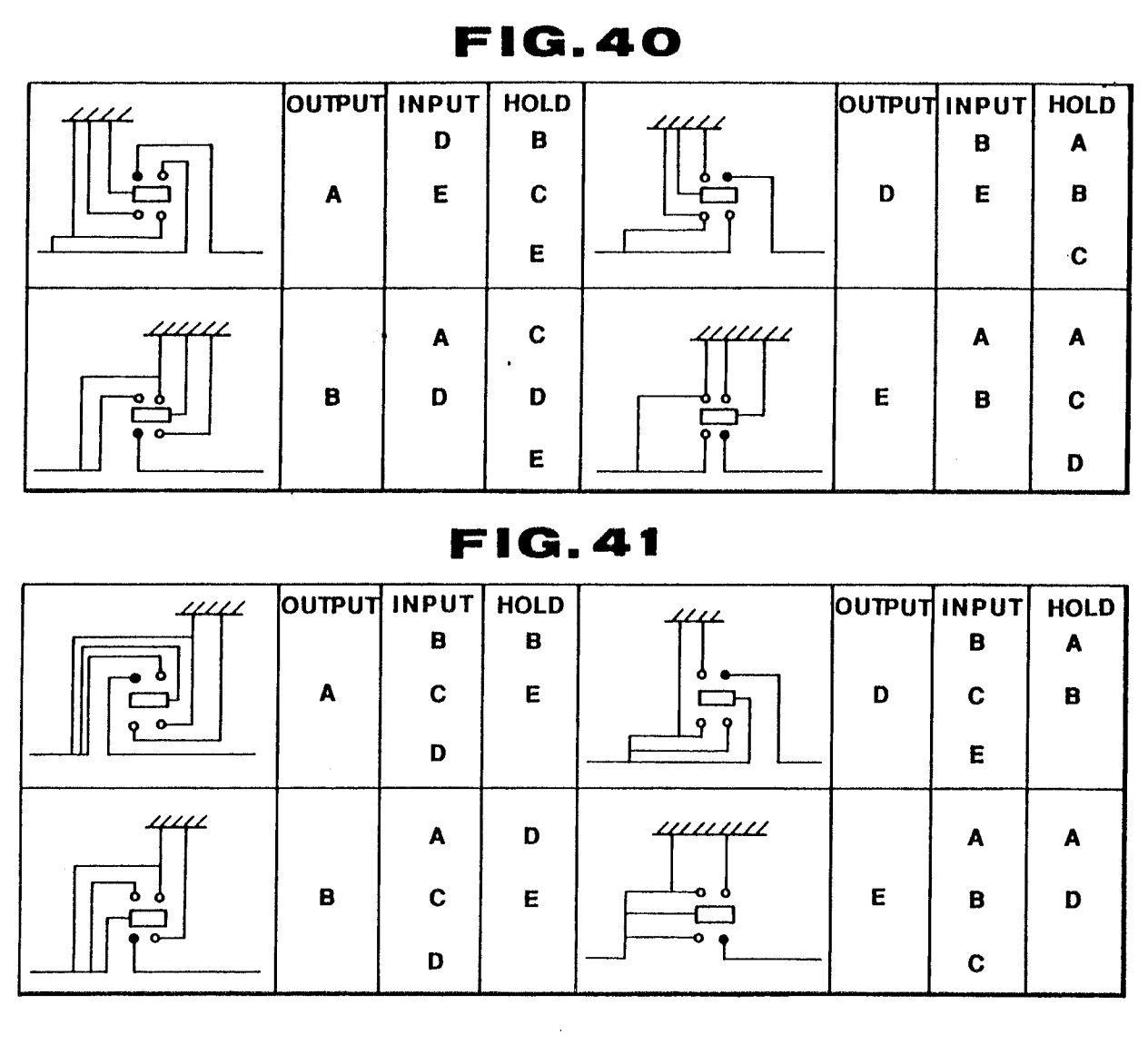

| OUTPUT | INPUT | HOLD |
|--------|-------|------|
| D | B | A |
|   | E | B |
|   |   | C |
| E | A | A |
|   | B | C |
|   |   | D |

| OUTPUT | INPUT | HOLD |
|--------|-------|------|
| A | D | B |
|   | E | C |
|   |   | E |
| B | A | C |
|   | D | D |
|   |   | E |

FIG.41

| OUTPUT | INPUT | HOLD |
|--------|-------|------|
| D | B | A |
|   | C | B |
|   | E |   |
| E | A | A |
|   | B | D |
|   | C |   |

| OUTPUT | INPUT | HOLD |
|--------|-------|------|
| A | B | B |
|   | C | E |
|   | D |   |
| B | A | D |
|   | C | E |
|   | D |   |

FIG.45

| | HI/C | EVEN L&R /C | UD /B | OVR /B | Rev /B | OD /B | L&R /B/OWC | UD/OWC | |
|---|---|---|---|---|---|---|---|---|---|
| R | | | | | | ○ | | ⊘ | |
| N | | | | | | | | ⊘ | |
| D 1 | ○ | | ○ | | | | ⊘ | ⊘ | |
| D 2 | ○ | ○ | ○ | | | | | ⊘ | |
| D 3 | ○ | ○ | ○ | | | | | ⊘ | |
| D 4 | | ○ | ○ | | | ○ | | | |
| D 5 | | ○ | ○ | | | ○ | | | |
| D 6 | | | | | | | | | |
| 4 1 | ○ | | ○ | ⊗ | | | ⊘ | ⊘⊘⊘ | |
| 4 2 | ○ | ○ | ○ | ◎ | | | | ⊘⊘⊘ | |
| 4 3 | | ○ | ○ | ◎ | | | | ⊘⊘⊘ | |
| 4 4 | | | | | | | ⊘ | | |
| 3 1 | ○ | | ○ | ⊗ | | | ⊘ | ⊘⊘ | |
| 3 2 | ○ | ○ | ○ | ◎ | | | | ⊘⊘ | |
| 3 3 | | | ○ | ◎ | | | | ⊘⊘ | |
| 2 1 | | | ○ | ⊗ | | | ⊘ | ⊘⊘ | |
| 2 2 | | ○ | ○ | ○ | | | | ⊘⊘ | |

Legend:
- ○ — ENGAGED
- ⊘ — OPERATED DURING DRIVE
- ◎ — ENGAGED WHEN TVO ≦ 1/16, AND ENGINE BRAKE IS APPLIED
- ⊗ (circled) — ENGAGED WHEN TVO ≦ 1/16, BUT ENGINE BRAKE IS NOT APPLIED
- ⊗ — ENGAGED, BUT ENGINE BRAKE IS NOT APPLIED

| | | | |
|---|---|---|---|
| FIG.46a | R | $-\dfrac{k}{\alpha_2}$ | 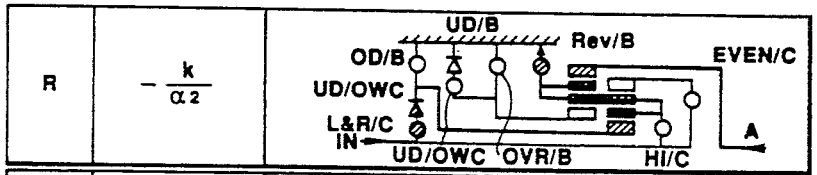 |
| FIG.46b | 1 | $\dfrac{\alpha_1 k + \alpha_2}{\alpha_2(1-\alpha_1)}$ | 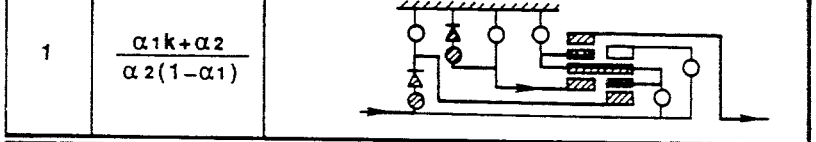 |
| FIG.46c | 2 | $\dfrac{1+\alpha_1 k}{1-\alpha_1}$ | 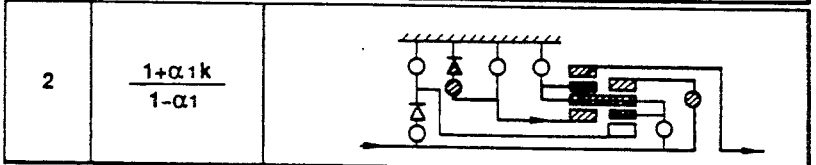 |
| FIG.46d | 3 | $\dfrac{1}{1-\alpha_1}$ | 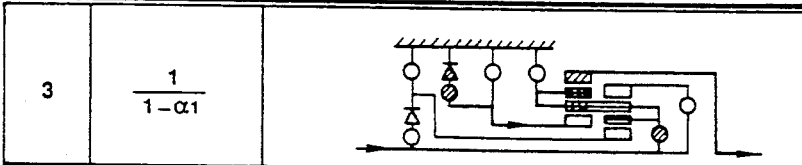 |
| FIG.46e | 4 | 1 | 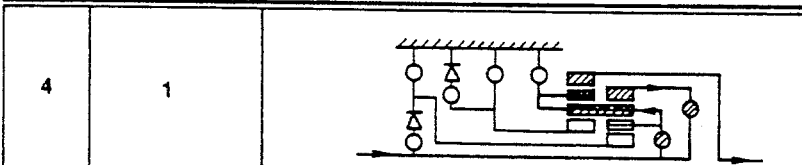 |
| FIG.46f | 5 | $\dfrac{k}{k+\alpha_2}$ | 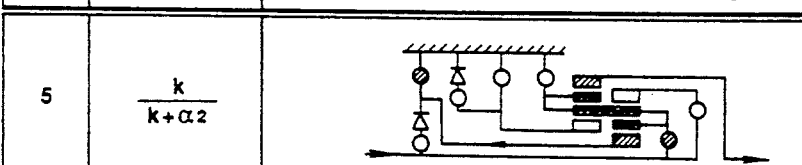 |
| FIG.46g | 6 | $\dfrac{k(1-\alpha_2)}{k+\alpha_2}$ | 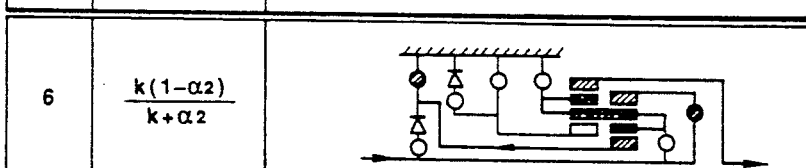 |

FIG. 49
(PRIOR ART)

|  | C1 | C2 | C3 | B1 | B2 | B3 |
|---|---|---|---|---|---|---|
| REVERSE 2ND | ◯ |  |  |  | ◯ |  |
| REVERSE 1ST | ◯ |  |  |  |  | ◯ |
| NEUTRAL |  |  |  |  |  | ◯ |
| FORWARD 1ST |  |  | ◯ |  |  | ◯ |
| FORWARD 2ND |  |  | ◯ |  | ◯ |  |
| FORWARD 3RD |  |  | ◯ | ◯ |  |  |
| FORWARD 4TH |  | ◯ | ◯ |  |  |  |
| FORWARD 5TH |  | ◯ |  | ◯ |  |  |
| FORWARD 6TH |  | ◯ |  |  | ◯ |  |

PLANETARY GEAR SYSTEM

This application is a continuation of application Ser. No. 07/482,976, filed Feb. 22, 1990, now abandoned.

BACKGROUND OF THE INVENTION

The present invention relates to planetary gear systems used in automatic transmissions.

Japanese Patent Provisional (unexamined) Publication No. 50-64660 discloses one conventional example. The planetary gear system of this conventional example has three single planet type gear sets, as shown in FIG. 47 of the drawings. The gear train shown in FIG. 47 has a first rotary member M1 composed of second and third sun gears, a second rotary member M2 formed by a third carrier, a third rotary member M3 composed of a first ring gear, a second carrier and a third ring gears, a fourth rotary member M4 composed of a second ring gear and a first carrier, and a fifth rotary member M5 formed by a first sun gear. The gear system further includes a connecting means which connects each of input shaft, output shaft, and case (or housing) with one or more of the five rotary members directly or through a selective engaging element such as a clutch or a brake. The input shaft is connected to the fifth, third and first rotary members M5, M3 and M1, respectively, through first, second and third clutches C1, C2 and C3. The fifth, fourth and third rotary members M5, M4 and M3 are connected with the case through first, second and third brakes B1, B2 and B3. The second rotary member M2 is connected directly to the output shaft. This gear system provides six forward speeds including a direct drive speed, and two reverse speeds by engaging two of the selective engaging elements simultaneously, as shown in a diagram of FIG. 48 and a logic table of FIG. 49.

This conventional gear system having three planetary gear sets is disadvantageous in the number of component parts, the manufacturing cost and the axial length of the gear train.

SUMMARY OF THE INVENTION

It is therefore an object of the present invention to provide a planetary gear system which can provide many speeds with a compact construction.

According to the present invention, a planetary gear system comprises first and second ring gears, first and second sun gears, a common planet carrier, and a pinion means. The common planet carrier serves as a first carrier constituting a first planetary gear set, with the first ring gear and the first sun gear, and as a second carrier constituting a second planetary gear set with the second ring gear and the second sun gear. The pinion means is rotatably supported on the common carrier, and connects, by gearing, the first ring gear and the first sun gear with each other to serve as an intermediate gearing of the first planetary gear set, and connects the second ring gear and the second sun gear with each other to serve as an intermediate gearing of the second planetary gear set. The pinion means comprises at least a long pinion having a first toothed portion meshing with at least one gear component of the first planetary gear set, and a second toothed portion meshing with at least one gear component of the second planetary gear set. The first ring gear, the first sun gear, the second ring gear, the second sun gear and the common carrier constitute, respectively, a rotary first ring gear member, a rotary first sun gear member, a rotary second ring gear member, a rotary second sun gear member and a rotary carrier member which can rotate relative to one another.

The planetary gear system of the invention may further include an input member such as an input shaft, an output member such as an output shaft or an output gear, a stationary housing member such as a transmission case, and a connecting means which connects each of the five rotary members with at least one of the input, output and housing members.

This gear system has a third equivalent planetary gear set constituted by one gear of the first planetary gear set, one gear of the second planetary gear set, and the common carrier, in addition to the first and second planetary gear sets.

BRIEF DESCRIPTION OF THE DRAWINGS

FIGS. 5 and 6 show a second embodiment of the invention, respectively, in skeleton diagram, speed relationship graph, and logic table.

FIGS. 7-12 are schematic views showing various types of planetary gear trains according to the invention.

FIG. 29 shows various types of planetary gear trains according to the invention each of which uses only one or two pinions in a pinion drive path of each of first and second planetary gear sets.

FIGS. 32-42 show variations of the eleventh embodiment.

FIGS. 43, 44 and 45 show a twelfth embodiment of the invention in skeleton diagram, speed relationship graph and logic table.

FIGS. 45a-46g show the power path of the gear system of the twelfth embodiment in each of the reverse, and six forward speeds.

FIGS. 47, 48 and 49 show a conventional six forward speed planetary gear system in skeleton diagram, speed relationship graph and logic table.

DETAILED DESCRIPTION OF THE INVENTION

Figure 1:
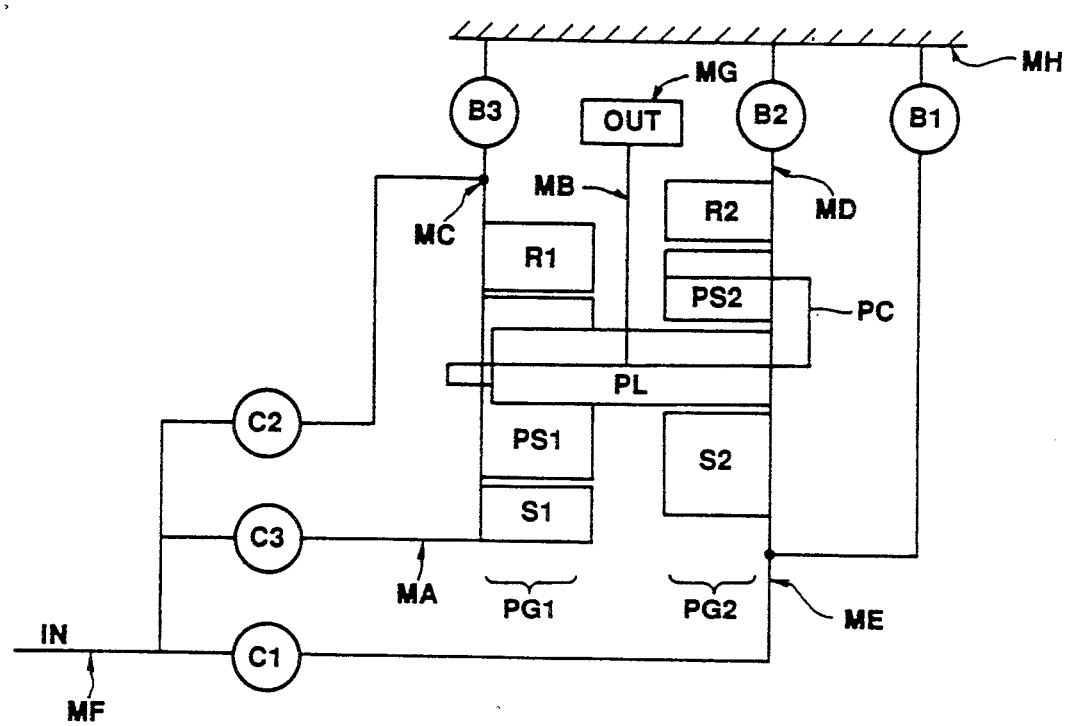
FIGS. 1, 2 and 3A show a first embodiment of the present invention, in a skeleton diagram, a graph that exhibits relationships among rotational speeds of different members of the gear train, and an engagement logic table, respectively.

A FIRST EMBODIMENT of the present invention is shown in a skeleton (symbol) diagram of FIG. 1.

The planetary gear system shown in FIG. 1 has a planetary gear train including first and second planetary gear sets PG1 and PG2. The first planetary gear set PG1 includes a first ring (internal) gear R1, a first sun gear S1, and a first planet pinion carrier. The second planetary gear set S2 includes a second ring (internal) gear R2, a second sun gear S2 and a second planet pinion carrier. The second ring gear R2 and the second sun gear S2 are both located on the same side of the first planetary gear set PG1 (that is, on the right side of PG1 in FIG. 1). The first and second planetary gear sets PG1 and PG2 of the first embodiment are different from each other in the ring gear size and the sun gear size, as shown in FIG. 1.

A pinion unit (pinion means) of the first embodiment includes one or more pinion groups each of which includes a first short pinion PS1, a second short pinion PS2, and a (stepless) long pinion PL. The first short pinion PS1 is in direct engagement with both the first ring gear R1 and the first sun gear S1. The second short pinion PS2 is in direct engagement with both the second ring gear R2. The long pinion PL has a first toothed portion meshing (directly) with the first short pinion PS1 on the first planetary gear set's side, and a second toothed portion meshing (directly) with both the second short pinion PS2 and the second sun gear S2 on the second planetary gear set's side.

. A common planet pinion carrier PC supports the axes of the pinions PS1, PS2 and PL of the pinion unit. The first and second planet carriers of the first and second gear sets PG1 and PG2 are connected together, and integrated into the common planet carrier PC.

The first sun gear S1, the common carrier PC, the first ring gear R1, the second ring gear R2, and the second sun gear S2 constitute, respectively, first, second, third, fourth and fifth rotary members MA, MB, MC, MD and ME which are capable of rotating relative to one another. The rotary member MB comprising the common carrier PC is a carrier member, and the four remaining rotary members are gear members.

The planetary gear system shown in FIG. 1 further includes three external members MF, MG and MH. The external member MF is an input member or shaft. The external member MG is an output member which is in the form of an output gear in the first embodiment. The external member MH is a stationary housing (or case). Thus, the planetary gear system has the eight members MA, MB, MC, MD, ME, MF, MG and MH, which are connected one another by a connecting means for connecting two of the members directly or through one or more engaging elements such as clutches and brakes.

In the first embodiment, the fifth, third and first rotary members ME, MC and MA are connected with the input member MF through first, second and third clutches C1, C2 and C3, respectively. The fifth, fourth and third rotary members ME, MD and MC are connected to the housing member MH through first, second and third brakes B1, B2 and B3, respectively. The second rotary member MB is directly connected with the output member (output gear) MG.

Figures 3A, 3B:
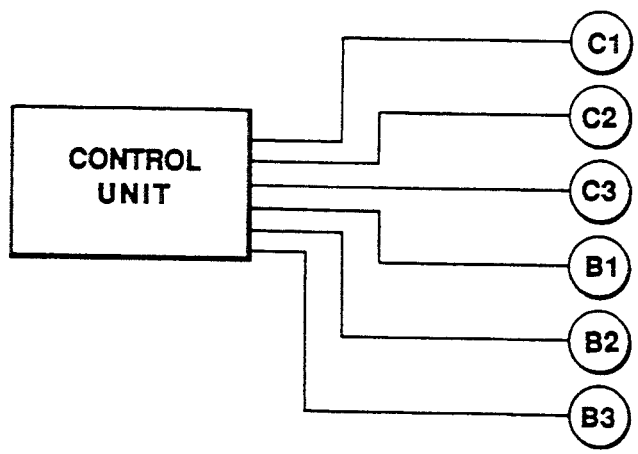
FIG. 3B is a schematic diagram for showing a transmission shift control unit.

As shown in FIG. 3B, the six selective engaging elements which are the three clutches C1, C2 and C3 and the three brakes B1, B2 and B3 are connected with a transmission shift control unit which can engage and disengage each of the six engaging elements.

Figure 2:
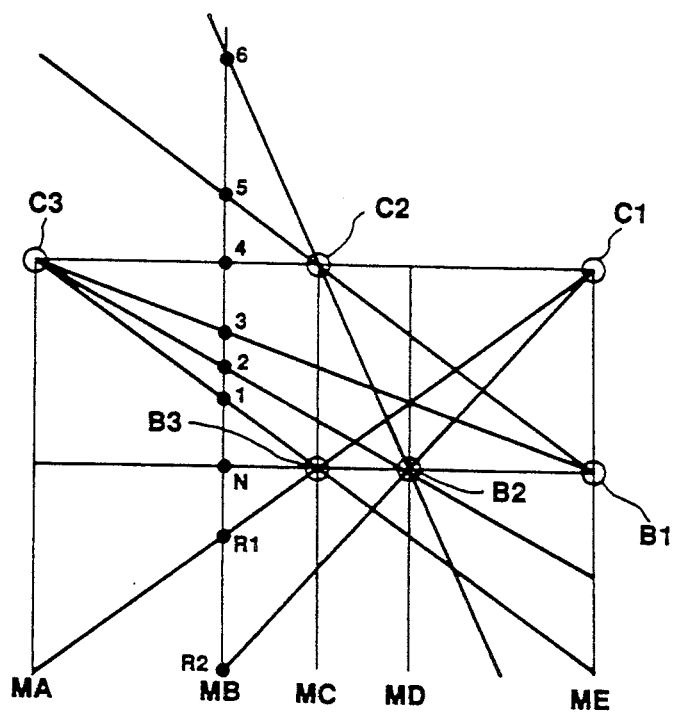

The planetary gear system of the first embodiment is operated as follows:

The planetary gear system of the first embodiment can provide each speed by imposing two constraint conditions by engaging two of the six selective engaging elements, as shown in a nomograph of FIG. 2. In the graph shown in FIG. 2, the positions of the first, second, third, fourth and fifth rotary members MA, MB, MC, MD and ME are determined along the horizontal axis according to the preset ratios of numbers of teeth on gears. The vertical axis expresses a rotational speed ratio which is a ratio of the rotational speed of each rotary member to the speed of the input rotation. The first brake B1 is positioned at an intersection point between a first horizontal straight line corresponding to zero speed ratio, and a vertical straight line passing through the position of the fifth member ME. The second and third brakes B2 and B3 are positioned, respectively, at intersection points among the first horizontal line corresponding to the speed ratio equal to zero, a vertical straight line passing through the position of the fourth rotary member MD, and a vertical straight line passing through the position of the third rotary member MC. The positions of the three clutches C1, C2 and C3 are all located on a second horizontal straight line corresponding to the speed ratio equal to one. The first clutch C1 is located at an intersection point between the second horizontal line and the vertical line passing through the point of the fifth member ME. The second clutch C2 is located at an intersection point between the second horizontal line and the vertical line passing through the position of the third member MC. The third clutch C3 is located at an intersection point between the second horizontal line and a vertical straight line passing through the position of the first member MA. A plurality of speed relationship lines are obtained by drawing straight lines each passing through the positions of the two engaging elements which are engaged at the same time. An intersection point between each relationship line and a vertical straight line passing through the second member MB indicates the reciprocal of the gear ratio. The gear ratio is a ratio of the input speed to the output speed of the output gear MG. By engaging two selected among the six engaging elements, the planetary gear system of the first embodiment provides three underdrive speed ratios which are greater than zero and smaller than one, two overdrive speed ratios which are greater than one, and two reverse speed ratios which are negative. The gear system further provide a direct drive speed ratio.

FIG. 3A shows an engagement logic table of the planetary gear system of the first embodiment. As shown in FIG. 3A, each shift from one gear ratio to a next higher or lower gear ratio is effected by a change of one selective engaging element from an engaged state to a disengaged state, and a change of another selective engaging element from the disengaged state to the engaged state. Thus, the number of changes of the selective engaging elements required for each shift is minimum, and it is easy to obtain the high quality of shifting.

In the reverse drive, the first clutch C1 is engaged to drive the fifth rotary member ME, and accordingly the fifth rotary member ME is the driving member connected with the input shaft MF. The gear system provides the second reverse speed by engaging the first clutch C1 and the second brake B2, and provides the first reverse speed by engaging the first clutch C1 and the third brake B3.

The gear train is in neutral when none or one of the selective engaging elements is engaged. In the first embodiment, the third brake B3 is engaged to obtain the neutral. The use of the third brake B3 can reduce the number of changes of the engaging elements required for effecting shifts between the first reverse speed and neutral, and shifts between the first forward speed and neutral.

In the forward underdrive positions, the third clutch C3 is engaged, and the first rotary member MA serves as the driving member. The gear system provides the first forward speed by engaging the third clutch C3 and the third brake B3, the second forward speed by engaging the third clutch C3 and the second brake B2, and the third forward speed by engaging the third clutch C3 and the first brake B1.

The fourth forward speed is a direct drive speed. The direct drive can be obtained by selecting any two out of the three clutches C1, C2 and C3. The planetary gear system of the first embodiment provides the direct drive fourth direct drive speed by engaging the second and third clutches C2 and C3 in order to obtain smooth shifting between the third speed and the fourth speed, and between the fourth speed and the fifth speed.

In the overdrive gear positions, the second clutch C2 is engaged, and the third rotary member C3 serves as the driving member. The gear system provides the fifth forward speed by engaging the second clutch C2 and the first brake B1, and the sixth forward speed by engaging the second clutch C2 and the second brake B2.

The planetary gear train of the first embodiment appears to have only two planetary gear sets PG1 and PG2. However, the planetary gear train has the five rotary members which are capable of rotating at different speeds under various constraint conditions. Therefore, the planetary gear train shown in FIG. 1 has, in effect, three planetary gear sets. That is, the planetary gear train has a third equivalent planetary gear set composed of one gear of the first planetary gear set PG1, one gear of the second planetary gear set PG2, and the common planet carrier PC, in addition to the first and second planetary gear sets PG1 and PG2.

Figure 47:
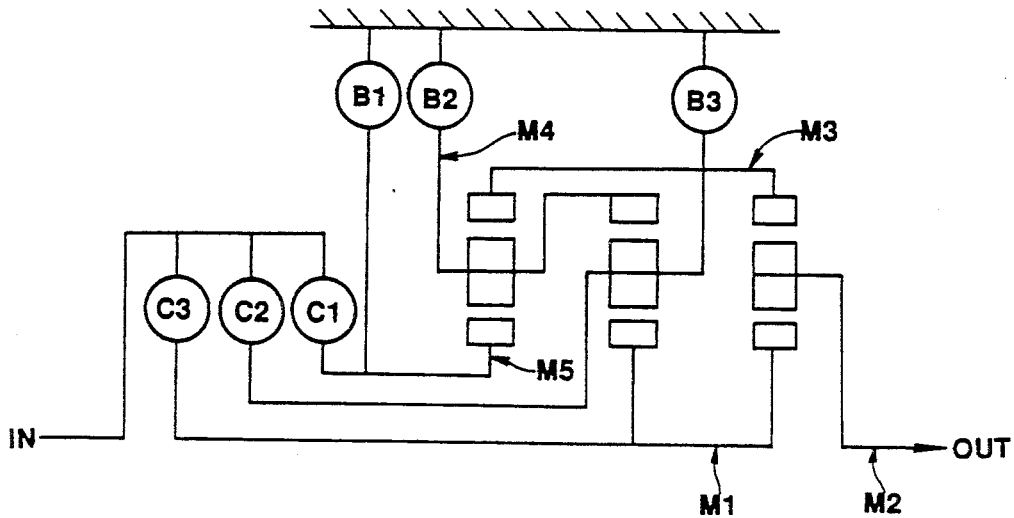
Figure 48:
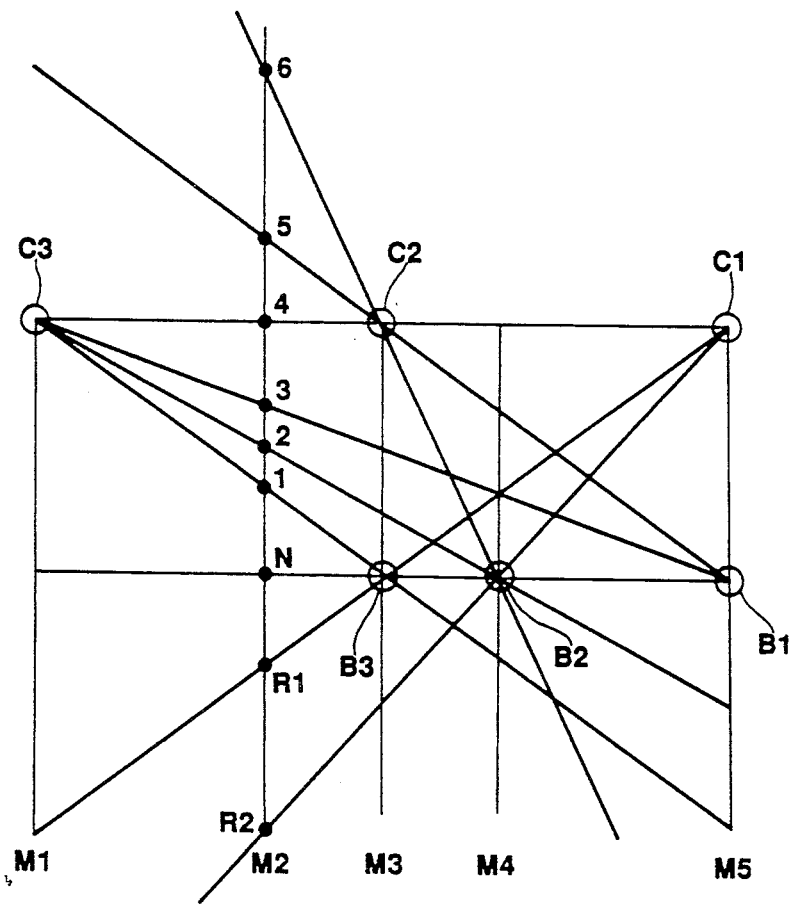

Consequently, the planetary gear system of the first embodiment is advantageous in cost reduction and reduction of the axial length of the gear train, as compared with the conventional planetary gear train consisting of three axially spaced planetary gear sets, and it is advantageous in capacity for satisfying the demand for an increase in the number of different gear ratios, and in freedom of design especially for high speeds, as compared with the conventional planetary gear train having only two planetary gear sets. The conventional planetary gear system (Japanese Patent unexamined provisional publication No. 50-64660) shown in FIG. 47 attains six forward speeds and two reverse speeds, as shown in the diagram of FIG. 48 and the logic table of FIG. 49, by employing three single planet type planetary gear sets. The planetary gear system of the first embodiment can achieve the same results, as shown in FIGS. 2 and 3, by employing only two ring gears and two sun gears A SECOND EMBODIMENT of the present invention is shown in FIGS. 4, 5 and 6.

Figure 4:
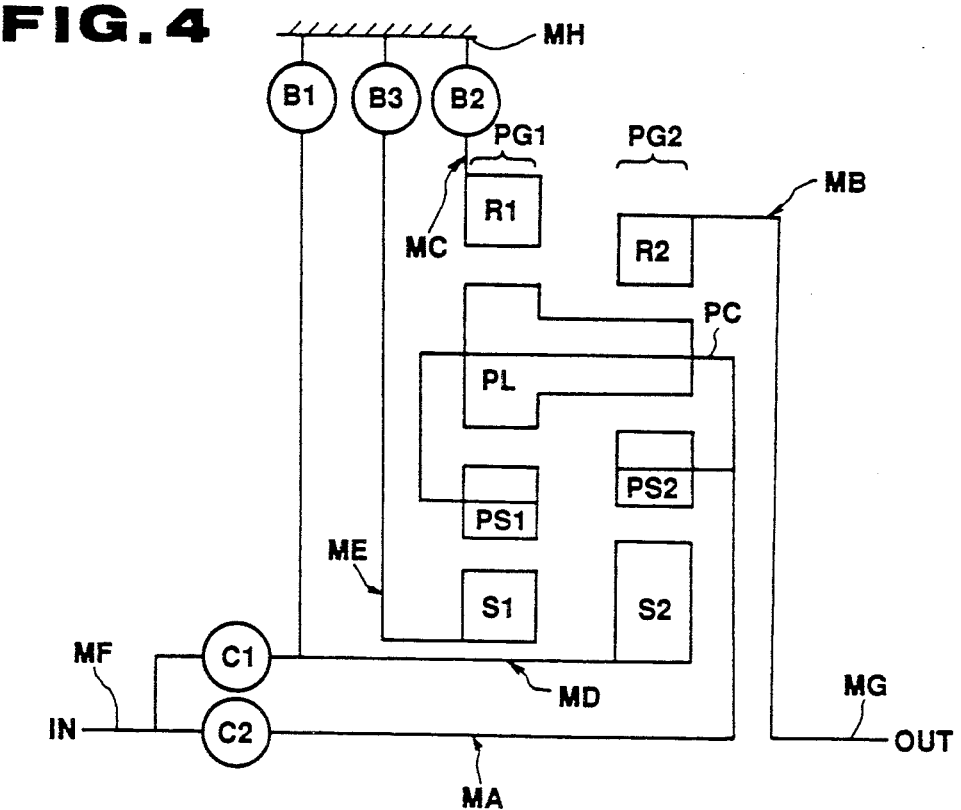
Figure 5:
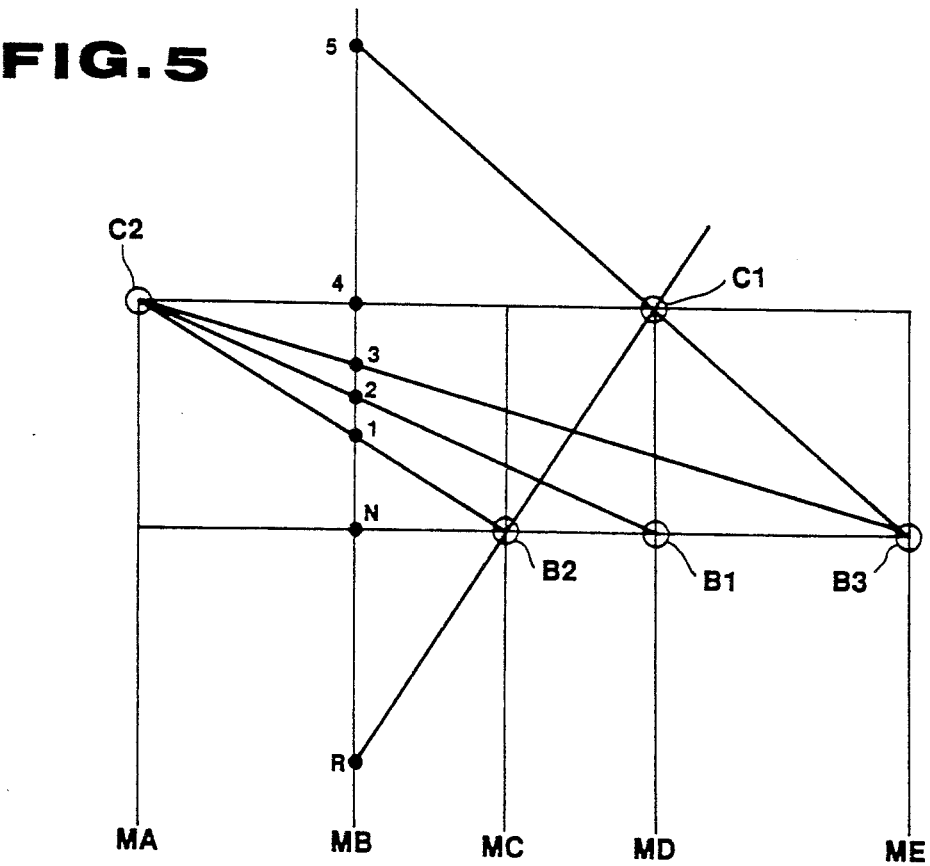

As shown in the skeleton diagram of FIG. 4, the planetary gear train of the second embodiment has the first planetary gear set PG1 including the first ring gear R1, the first sun gear S1 and the first carrier, and the second planetary gear set PG2 including the second ring gear R2, the second sun gear S2 and the second carrier.

The pinion unit (pinion means) of the second embodiment includes one or more pinion groups each of which has a first short pinion PS1, a second short pinion PS2, and a long stepped pinion PL. The first short pinion PS1 meshes with the first sun gear S1, and the second short pinion PS2 meshes with the second sun gear S2. The long pinion PL has a first toothed portion meshing with both the first ring gear R1 and the first short pinion PS1, and a second toothed portion meshing with both the second ring gear R2 and the second short pinion PS2. The long pinion PL of the second embodiment is a stepped pinion, and the number of teeth of the first portion is not equal to that of the second portion.

The first and second carriers are connected together, and integrated into the common planet carrier PC. The common planet carrier PC rotatably supports the first and second short pinions PS1 and PS2 and the long pinion PL.

In the second embodiment, the common carrier PC constitutes a first rotary member MA. Second, third, fourth and fifth rotary members MB, MC, MD and ME are constituted, respectively, by the second ring gear R2, the first ring gear R1, the second sun gear S2, and the first sun gear S1, as shown in FIG. 4. In addition to the gear or carrier R1, R2, S1, S2 or PC, each rotary member may include an associated part such as a drum. At any rate, each rotary member of the invention rotates as a unit.

In this way, the planetary gear system of the second embodiment has the five distinct rotary members MA, MB, MC, MD and ME which can rotate relative to one another, like the gear system of the first embodiment. The gear system further includes an input member MF in the form of an input shaft, an output member MG in the form of an output shaft, and stationary housing member (case) MH. Thus, the planetary gear system of the second embodiment has the eight members MA through MH, like the system of the first embodiment.

The planetary gear system of the second embodiment has a first connecting means which connects the fourth rotary member MD with the input shaft MF through a first clutch C1, a second connecting means which connects the first rotary member MA with the input shaft MF through a second clutch C2, a third connecting means which connects the fourth rotary member MD with the housing member MH through a first brake B1, a fourth connecting means which connects the third rotary member MC with the housing member MH through a second brake B2, a fifth connecting means which connects the fifth rotary member ME with the housing member MG through a third brake B3, and a sixth connecting means which connects the second rotary member MB directly (with no selective engaging element) to the output shaft MG. Thus, the gear system of the second embodiment has the five selective engaging elements C1, C2, B1, B2 and B3. The selective engaging elements are connected with a transmission shift control unit.

The planetary gear system of the second embodiment is operated as follows:

As shown in the nomographic diagram of FIG. 5, the shift control unit of the second embodiment obtains each speed by imposing two restraint conditions on the gear train by engaging two of the selective engaging elements. The gear system of the second embodiment provides one overdrive speed, three underdrive speeds, a direct speed and one reverse speed, as shown in the diagram of FIG. 5 and the logic table of FIG. 6. As in the first embodiment, the shift control unit of the second embodiment can smoothly perform each shift from one speed to the next higher or lower speed by changing one selective engaging element from the engaged state to the disengaged state, and changing another selective engaging element from the disengaged state to the engaged state.

In reverse, the transmission shift control unit engages the first clutch C1 and the second brake B2. Therefore, an input rotation is inputted to the fourth rotary member MD of the second sun gear S2, and the third rotary member MC of the first ring gear R1 is held (or grounded) to the stationary housing member MH.

It is possible to put the gear train in neutral by engaging none or one of the selective engaging elements. In the second embodiment, the shift control unit obtains the neutral position by engaging the second brake B2 in order to reduce the number of the selective engaging elements which must be operated in shifts from reverse to neutral and vice versa, and shifts from first forward speed to neutral and vice versa.

In the underdrive forward speeds, the transmission shift control unit engages the second clutch C2 to connect the input shaft MF to the first rotary member MA of the common carrier PC. The planetary gear system produces the first forward speed by engaging the second clutch C2 and the second brake B2, the second forward speed by engaging the second clutch C2 and the first brake B1, and the third forward speed by engaging the second clutch C2 and the third brake B3. The direct drive fourth forward speed is obtained by engaging the first and second clutches C1 and C2. The overdrive fifth forward speed is obtained by engaging the first clutch C1 and the third brake B3. In the overdrive speed, the fourth rotary member MD is the driving member connected with the input shaft MF.

In mathematical formulas in FIG. 6 expressing the gear ratios, $\alpha_1$ (alpha 1) is a ratio of the numbers of teeth of the first sun gear S1 and the first ring gear R1, $\alpha_2$ (alpha 2) is a ratio of the numbers of teeth of the second sun gear S2 and the second ring gear R2, and k is a coefficient defined as $Zr_1 Zp_2/Zr_2 Zp_1$ where $Zr_1$ is the number of teeth of the first ring gear R1, $Zp_1$ is the number of the pinion teeth meshing with the first ring gear R1, $Zr_2$ is the number of teeth of the second ring gear R2, and $Zp_2$ is the number of the pinion teeth meshing with the second ring gear R2.

The planetary gear system of the second embodiment has the first planetary gear set PG1, the second planetary gear set PG2 and the third equivalent planetary gear set PG3 composed of one gear of the first set PG1, one gear of the second set PG2, and the common carrier PC, and offers the same advantages as in the first embodiment. In the second embodiment, five forward speeds and one reverse speed are obtained by using five engaging elements.

FIGS. 7-12 show various planetary gear trains according to the present invention, each of which includes the first planetary gear set PG1 comprising the first ring gear R1 and the first sun gear S1, the second planetary gear set PG2 comprising the second ring gear R2 and the second sun gear S2, and the third equivalent planetary gear set comprising the first ring gear R1, the second ring gear R2 and the common carrier PC, as in the preceeding embodiments. The gear trains are classified into eight categories, herein named SS-S, SS-W, SW-S, WS-S, SW-W, WS-W, WW-S and WW-W, respectively. Each category includes a basic type which is smallest in number of pinions in the category (or whose long pinion is stepless when there are two types having the same minimum number of pinions), and modified types.

In the SS-S category shown in FIG. 7, each of the first, second and third planetary gear sets is restricted by a relationship of a single pinion planetary gear set. In FIG. 7, there are one basic type in the lefthand block of FIG. 7, and three modified types in the righthand block.

The SS-W category shown in FIG. 8 includes one basic type having a stepped long pinion and two modified type. Each of the types of this category has the first and second planetary gear sets PG1 and PG2 which are both restricted by the relationship of a single pinion planetary gear set, and the third equivalent planetary gear set which is restricted by a relationship of a double pinion planetary gear set.

In the SW-S category shown in FIG. 9, the first planetary gear set PG1 and the third equivalent planetary gears set are restricted by the single pinion planetary gear relationship, and the second planetary gear set PG2 s restricted by the double pinion type relationship. FIG. 9 shows one basic type on the left side, and three modified types on the right side.

In the WS-S category, the second planetary gear set PG2 and the third equivalent planetary gear set are restricted by the single pinion type relationship, and the first planetary gear set PG1 is restricted by the double pinion type relationship. Types belonging to this category are not shown because they can be easily obtained by interchanging the positions of the first and second planetary gear sets PG1 and PG2.

FIG. 10 shows the SW-W category in which the first planetary gear set PG1 is restricted by the single pinion type relationship, and the second planetary gear set PG2 and the third equivalent planetary gear set are restricted by the double pinion type relationship. FIG. 10 shows one basic type and two modified type of the SW-W category. The first embodiment shown in FIG. 1 employs the gear train of the SW-W category.

The WS-W category is a category in which the second planetary gear set PG2 is restricted by the single pinion type relationship, and the first planetary gear set PG1 and the third equivalent planetary gear set are restricted by the double pinion type relationship. Basic and modified types (not shown) of the WS-W category are obtained by replacing the first and second gear sets PG1 and PG2 with each other.

Figure 11:
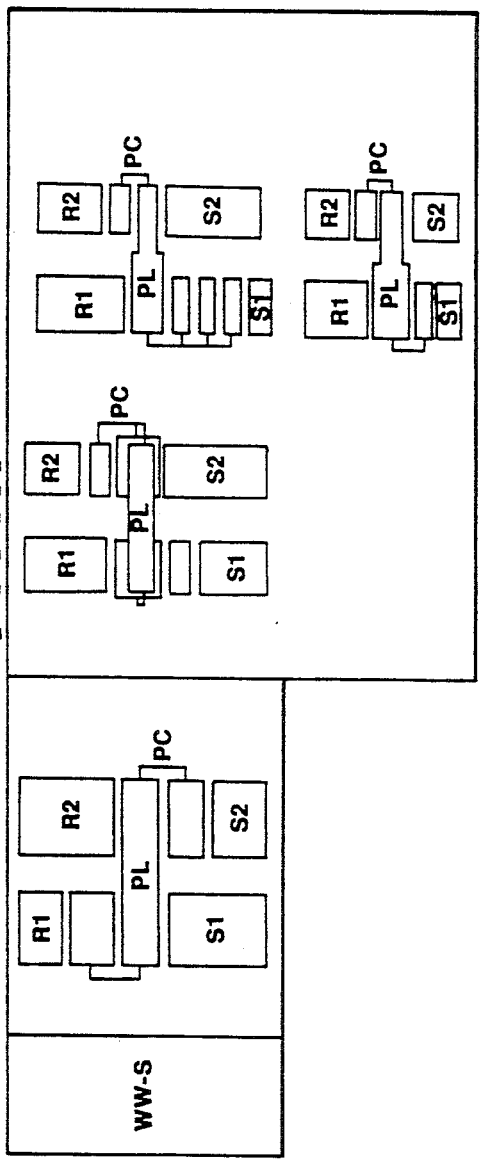

FIG. 11 shows one basic type and three modified types of the WW-S category in which the first and second planetary gear sets PG1 and PG2 are restricted by the double pinion type relationship, and the third equivalent planetary gear set is restricted by the single pinion type relationship.

Figure 12:
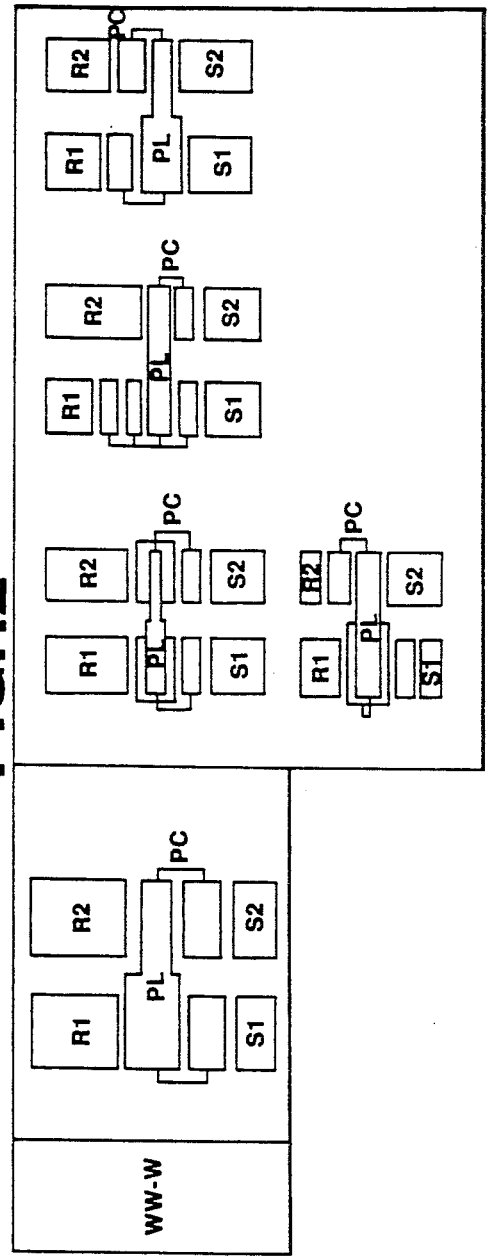

FIG. 12 shows one basic type and four modified types of the WW-W category in which all the first, second and third planetary gear sets are restricted by the double pinion type relationship. The second embodiment shown in FIG. 4 employs the basic type of the WW-W category.

The planetary gear designs of the present invention are advantageous in reduction of manufacturing cost and gear train's axial length, and suitable for satisfying the recent demand for more speeds.

Figures 13, 14:
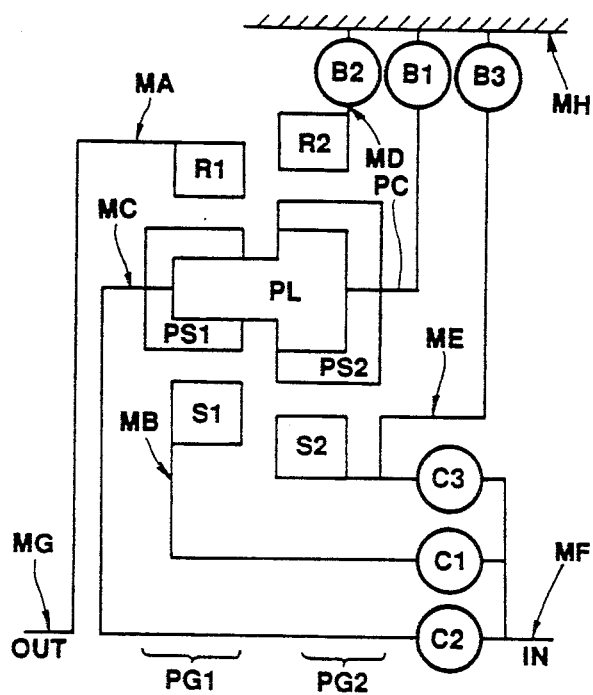
FIGS. 13 and 14 show a third embodiment of the invention in skeleton diagram and logic table, respectively.

A THIRD EMBODIMENT of the present invention is shown in FIGS. 13 and 14. The gear train of the third embodiment belongs to the SS-W category.

The planetary gear train of the third embodiment has the first and second ring gears R1 and R2, the first and second sun gears S1 and S2 and the common carrier PC, each of which constitutes a unique one of the five rotary members of the present invention as in the preceding embodiments.

The pinion unit of the third embodiment includes one or more pinion groups each of which has first and second short pinions PS1 and PS2, and a long pinion PL. The first short pinion PS1 meshes with both the first ring gear R1 and the first sun gear S1. The second short pinion PS2 meshes with both the second ring gear R2 and the second sun gear S2. The long pinion PL has a first toothed portion meshing with the first short pinion PS1 on the first planetary gear set's side, and a second toothed portion meshing with the second short pinion PS2 on the second planetary gear set's side. The number of teeth of the first portion may be equal to that of the second portion However, the third embodiment employs the stepped long pinion PL in which the number of teeth of one of the first and second toothed portions is different from that of the other. As shown in FIG. 13, the diameter of the second portion is larger than that of the first portion. The pinions are all carried on the common carrier PC.

In the third embodiment, the first rotary member MA comprises the first ring gear R1, the second rotary member MB comprises the first sun gear S1, the third rotary member MC comprises the common carrier PC, the fourth rotary member MD comprises the second ring gear R2, and the fifth rotary member ME comprises the second sun gear S2.

The second rotary member MB of the first sun gear S1 is connected with the input shaft MF by a connecting means which includes a first clutch C1. The third rotary member MC of the common carrier PC is connected with the input shaft MF by a connecting means which includes a second clutch C2. The fifth rotary member ME of the second sun gear S2 is connected with the input shaft MF by a connecting means which includes a third clutch C3. The third rotary member MC is connected to the housing member MH by a connecting means including a first brake B1. The fourth rotary member MD of the second sun gear S2 is connected to the housing member MH by a connecting means including a second brake B2. The fifth rotary member ME is connected to the housing member MH by a connecting means including a third brake B3. The first rotary member MA of the first ring gear R1 is directly connected with the output shaft MG by a connecting means having no selective engaging element.

The transmission shift control unit is connected with the three clutches C1, C2, and C3, and the three brakes B1, B2 and B3, and arranged to produce each speed by engaging two of these six selective engaging elements, as shown in the engagement logic table of FIG. 14. Each shift is accomplished by the minimum number of shift operations to change one engaging element from one state to the other. The planetary gear system of the third embodiment, therefore, can provide five forward speeds and two reverse speeds with fine quality of shifting.

In FIG. 14, the first and second reverse speeds are denoted, respectively, by −1 and −2, and the neutral is denoted by 0. The positive integers are used to denote the forward speeds. Each small circle in FIG. 14 denotes clutch or brake engagement. In the mathematical formulas in FIG. 14, $\alpha_1$ (alpha 1) is a gear ratio of the number $Zs_1$ of teeth in the first sun gear 1 to the number $Zr_1$ of teeth in the first ring gear R1 ($\alpha_1 = Zs_1/Zr_1$), $\alpha_2$ (alpha 2) is a gear ratio of the number $Zs_2$ of teeth in the second sun gear S2 to the number $Zr_2$ of teeth in the second ring gear R2 ($\alpha_2 = Zs_2/Zr_2$), and k is a coefficient which is indicative of the relationship between the first ring gear R1 and the second ring gear R2 and which is given by $k = Zr_1 Zp_2/Zr_2 Zp_1$, where $Zp_1$ is the number of teeth in the first portion of the long pinion PL, and $Zp_2$ is the number of teeth in the second portion of the long pinion PL.

In the third embodiment, the rotational speed $Nr_1$ of the first ring gear R1, the rotational speed $Ns_1$ of the first sun gear and the rotational speed Nc of the common carrier PC are constrained by a first single pinion type mathematical relationship of the single pinion planetary gear set which is expressed as;

$$Nr_1 + \alpha_1 Ns_1 = (1+\alpha_1)N_c \qquad (b\ 1S)$$

The rotational speed $Nr_2$ of the second ring gear R2, the rotational speed $Ns_2$ of the second sun gear S2 and the rotational speed Nc of the common carrier PC are constrained by a second single pinion type mathematical relationship of the single pinion planetary gear set which is given by;

$$Nr_2 + \alpha_2 Ns_2 = (1+\alpha_2)Nc \qquad (2S)$$

The rotational speed $Nr_1$ of the first ring gear R1, the rotational speed $Nr_2$ of the second ring gear R2 and the rotational speed Nc of the common carrier PC are constrained by a third double pinion type mathematical relationship of the double pinion planetary gear set which is given by;

$$Nr_1 - kNr_2 = (1-k)Nc \qquad (3W)$$

Figures 15, 16:
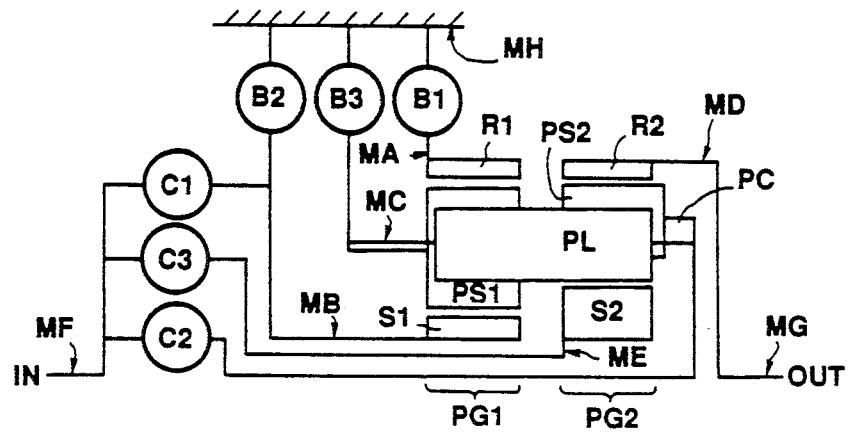
FIGS. 15 and 16 show a fourth embodiment of the invention in skeleton diagram and logic table.

A FOURTH EMBODIMENT of the present invention is shown in FIGS. 15 and 16. In the fourth embodiment, the first planetary gear set PG1 is restricted by the single pinion planetary gear relationship, and the second planetary gear set PG2 and the third equivalent planetary gear set PG3 comprising the first and second ring gears R1 and R2 and the common carrier PC are restricted by the double pinion planetary gear relationship.

The planetary gear train of the fourth embodiment has the first and second ring gears R1 and R2, the first and second sun gears S1 and S2, and the common carrier PC as in the preceding embodiments. The pinion unit includes one or more pinion groups each of which includes a first short pinion PS1, a second short pinion PS2 and a stepless long pinion PL. The first short pinion PS1 meshes with both the first ring and sun gears R1 and S1. The second short pinion PS2 meshes with the second ring gear R2. The long pinion PL has a first toothed portion meshing with the first short pinion PS1 in the first planetary gear set PG1, and a second toothed portion meshing with both the second short pinion PS2 and the second sun gear S2. The diameters of the first and second portions of the long pinion PL of the fourth embodiment are equal to each other.

In the fourth embodiment, the first rotary member MA comprising the first ring gear R1 is connected to the housing member MH by a connecting means which includes a first brake B1. The second rotary member MB comprising first sun gear S1 is connected with the input shaft MF through a first clutch C1, and with the housing member MH through a second brake B2. The third rotary member MC comprising the common carrier PC is connected with the input shaft MF through a second clutch C2, and with the housing member MH through a third brake B3. The fourth rotary member MD composed of the second ring gear R2 is directly connected with the output shaft MG. The fifth rotary member ME composed of the second sun gear S2 is connected with the input shaft MF through a third clutch C3.

The gear system of the fourth embodiment produces each speed by engaging two of the six selective engaging elements, and provides five forward speeds and one reverse speed. Each shift is accomplished by the minimum number of engaging elements.

In the fourth embodiment, the first planetary gear set PG1 is restricted by the first single pinion planetary gear relationship Eq. (1S), and the third equivalent planetary gear set PG3 comprising the first and second ring gears R1 and R2 and the common carrier PC is restricted by the third double pinion planetary gear relationship Eq. (3W). The second planetary gear set PG2 is restricted by the following second double pinion type relationship:

$$Nr_2 - a_2 Ns_2 = (1 - a_2) Nc \qquad (2W)$$

Figures 17, 18:
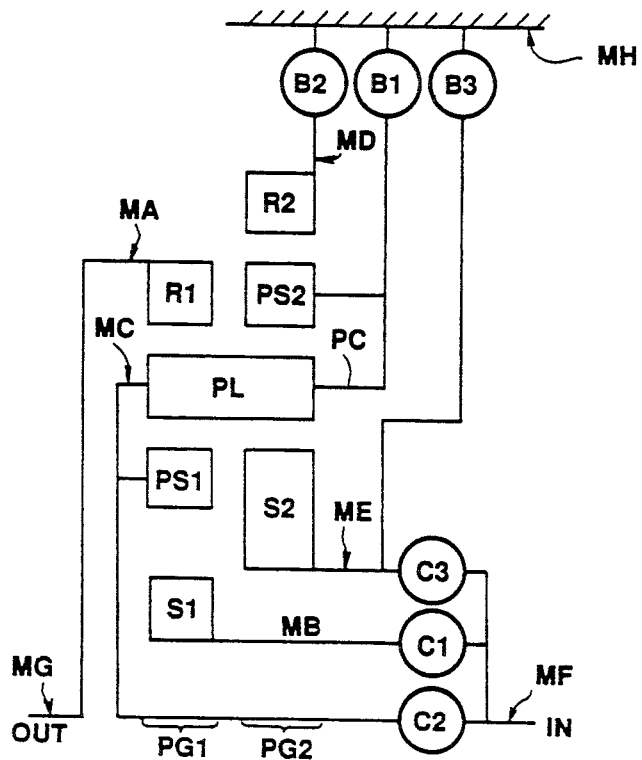
FIGS. 17 and 18 show a fifth embodiment of the invention in skeleton diagram and logic table.

A FIFTH EMBODIMENT of the present invention is shown in FIGS. 17 and 18, which employs the gear train of the WW-S category.

In the fifth embodiment, the first rotary member MA composed of the first ring gear R1 is directly connected with the output shaft MG. The second rotary member MB composed of the first sun gear S1 is connected with the input shaft MF through a first clutch C1. The third rotary member MC composed of the common carrier PC is connected with the input shaft MF through a second clutch C2, and with the housing member MH through a first brake B1. The fourth rotary member MD composed of the second ring gear R2 is connected with the housing member MH through a second brake B2. The fifth rotary member ME composed of the second sun gear S2 is connected with the input shaft MF through a third clutch C3, and with the housing member MH through a third brake B3.

The pinion unit of the fifth embodiment has one or more pinion groups each of which includes a first short pinion PS1, a second short pinion PS2 and a stepless long pinion PL. The first short pinion PS1 meshes with the first sun gear S1, and the second short pinion PS2 meshes with the second ring gear R2. The long pinion PL has a first toothed portion meshing with both the first short pinion PS1 and the first ring gear R1, and a second toothed portion meshing with both the second short pinion PS2 and the second sun gear S2. The diameters of the first and second portions are equal to each other.

The gear system of the fifth embodiment provides five forward speeds and two reverse speeds each of which is obtained by engaging two of the six engaging elements, and accomplishes each gear shift with the high shifting quality.

In the fifth embodiment, the first planetary ear set PG1 is restricted by a first double pinion type relationship given by:

$$Nr_1 - a_1 Ns_1 = (1 - a_1) Nc \qquad (1W)$$

The second planetary gear set PG2 is restricted by the second double pinion type relationship Eq. (2W). The third equivalent planetary gear set PG3 is restricted by a third single pinion type relationship given by:

$$Nr_1 + kNr_2 = (1 + k) Nc \qquad (3S)$$

Figures 19, 20:
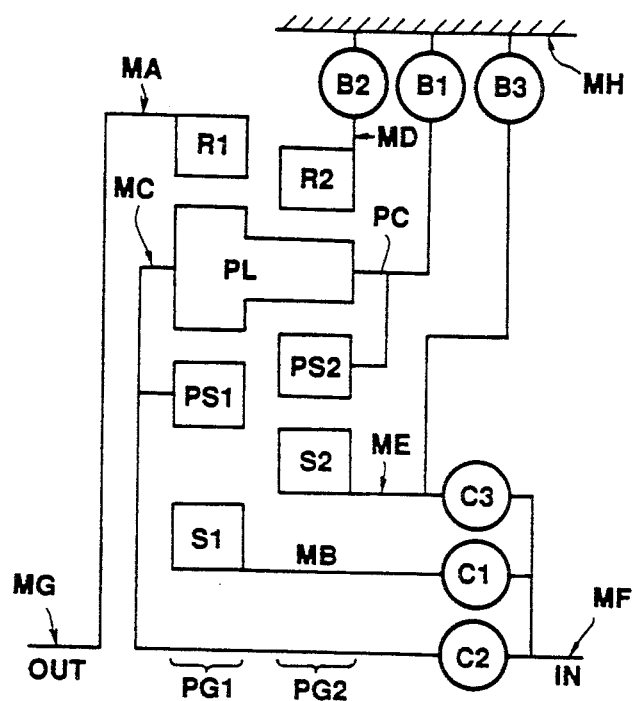
FIGS. 19 and 20 show a sixth embodiment of the invention in skeleton diagram and logic table.

A SIXTH EMBODIMENT of the present invention is shown in FIGS. 19 and 20. The sixth embodiment employs the gear train of the WW-W category.

The pinion unit of the sixth embodiment has one or more pinion groups each of which includes first and second short pinions PS1 and PS2 and a stepped long pinion PL. The first short pinion PS1 meshes with the first sun gear S1. The second short pinion PS2 meshes with the second sun gear S2. The stepped long pinion P1 of the sixth embodiment has a first toothed portion which meshes with both the first ring gear R1 and the first short pinion PS1, and a second toothed portion which meshes with both the second ring gear R2 and the second short pinion PS2. In the long pinion PL of the sixth embodiment, the numbers of teeth in the first and second portions are different from each other. The diameter of the first portion is greater than that of the second portion, as shown in FIG. 19.

In the sixth embodiment, the output shaft MG is directly connected with the first rotary member MA which is the first ring gear member including the first ring gear R1. The input shaft MF is connected through a first clutch C1 with the second rotary member MB including the first sun gear S1, through a second clutch C2 with the third rotary member MC of the common carrier PC, and through a third clutch C3 with the fifth rotary member ME of the second sun gear S2. The stationary housing member MH is connected through a first brake B1 with the third rotary member MC of the common carrier PC, through a second brake B with the fourth rotary member MD of the second ring gear R2, and through a third brake B3 with the fifth rotary member ME of the second sun gear S2.

The gear system of the sixth embodiment can provide five forward speeds and two reverse speeds by engaging two of the six selective engaging elements, and improve the quality of shifting, as in the preceding embodiments.

Figures 21, 22:
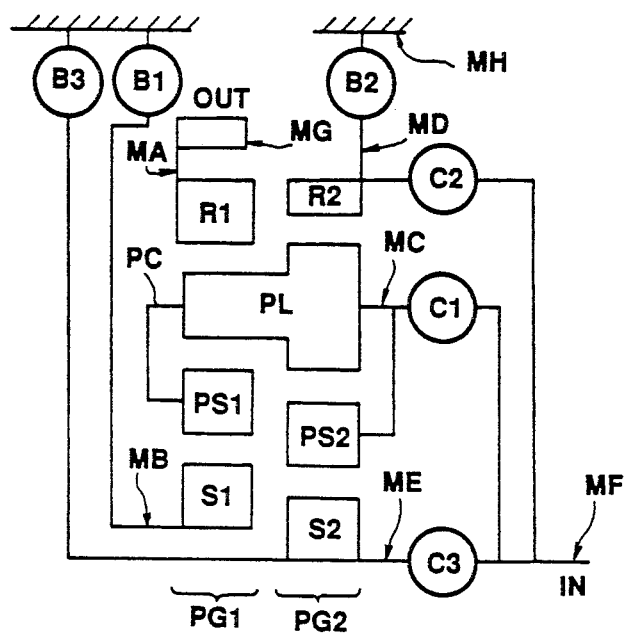
FIGS. 21 and 22 show a seventh embodiment of the invention in skeleton diagram and logic table.

A SEVENTH EMBODIMENT of the present invention is shown in FIGS. 21 and 22. The gear train of the seventh embodiment belongs to the WW-W category.

The pinion unit has one or more groups each of which includes first and second short pinions PS1 and PS2, and a stepped long pinion PL. The first short pinion PS1 meshes with the first sun gear S2, and the second short pinion PS2 meshes with the second sun gear S2. The long pinion PL of the seventh embodiment has a first toothed portion which meshes with both the first ring gear R1 and the first short pinion PS1, and a second toothed portion which meshes with both the second ring gear R2 and the second short pinion PS2. In the seventh embodiment, the first portion is smaller in size than the second portion. In the seventh embodiment, the size of the first ring gear R1 is smaller than the size of the second ring gear R2, and the size of the first sun gear S1 is larger than the size of the second sun gear S2.

In the seventh embodiment shown in FIG. 21, the output gear MG is directly connected with the first rotary member MA of the first ring gear R1. The input shaft MF is connected through a first clutch C1 with the third rotary member MC of the common carrier PC, through a second clutch C2 with the fourth rotary member MD of the second ring gear R2, and through a third clutch C3 with the rotary member ME of the second sun gear S2. The housing member MH is connected through a first brake B1 with the rotary member MB of the first sun gear S1, through a second brake B2 with the rotary member MD of the second ring gear R2, and through a third brake B3 with the rotary member ME of the second sun gear S2.

The gear system of the seventh embodiment can provide six forward speeds and one reverse speed by engaging two of the six selective engaging elements.

Figures 23, 24:
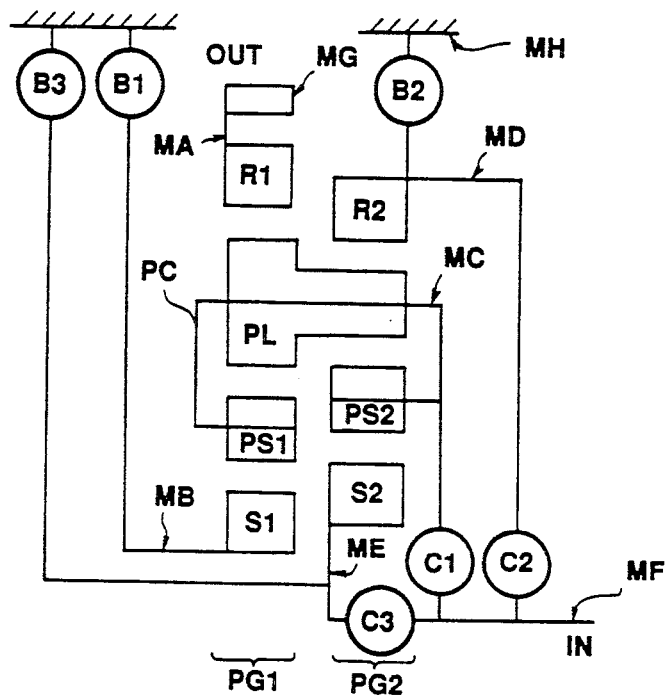
FIGS. 23 and 24 show an eighth embodiment of the invention in skeleton diagram and logic table.

AN EIGHTH EMBODIMENT of the present invention is shown in FIGS. 23 and 24. The gear train of the eighth embodiment falls under the WW-W category. The gear train of the eighth embodiment is identical in type to the gear train of the sixth embodiment shown in FIG. 19.

The output gear MG is directly connected with the rotary member MA of the first ring gear R1. The input shaft MF is connected through a first clutch C1 with the rotary member MC of the common carrier PC, through a second clutch C2 with the rotary member MD of the second ring gear R2, and through a third clutch C3 with the rotary member ME of the second sun gear S2. The stationary housing member MH is connected through a first brake B1 with the rotary member MB of the first sun gear S1, through a second brake B2 with the rotary member MD of the second ring gear R2, and through a third brake B3 with the rotary member ME of the second sun gear S2.

The gear system of the eighth embodiment can provide five forward speeds and one reverse speed by engaging two of the six selective engaging elements with the fine shifting quality.

Figures 25, 26:
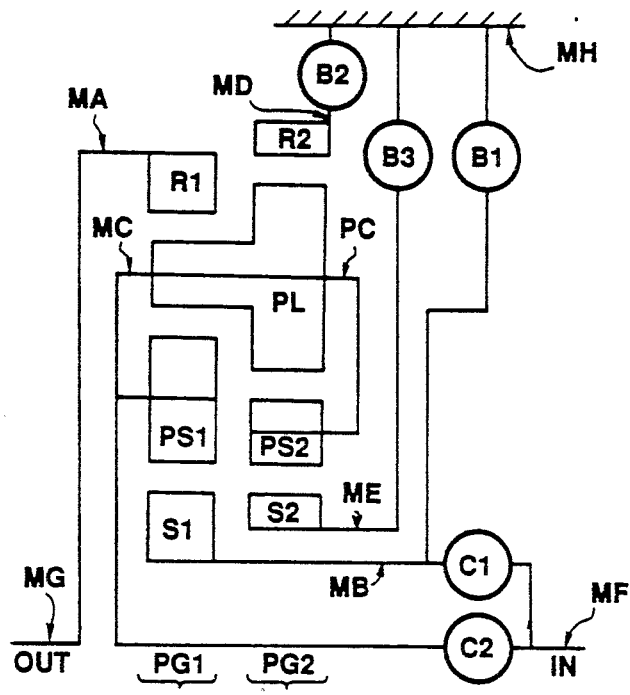
FIGS. 25 and 26 show a ninth embodiment of the invention in skeleton diagram and logic table.

A NINTH EMBODIMENT of the invention is shown in FIGS. 25 and 26. The gear train of the ninth embodiment comes in the WW-W category. The gear train of the ninth embodiment is similar in type to the gear train of the seventh embodiment shown in FIG. 21.

The first short pinion PS1 meshes with the first sun gear S1, and the second short pinion PS2 meshes with the second sun gear S2. The first portion of the long pinion PL meshes with both the first ring gear R1 and the first short pinion PS1, and the second portion meshes with both the second ring gear R2 and the second short pinion PS2.

The output shaft MG is directly connected with the rotary member MA of the first ring gear R1. The input shaft MF is connected through a first clutch C1 with the rotary member MB of the first sun gear S1, and through a second clutch C2 with the rotary member MC of the common carrier PC. The stationary housing member MH is connected through a first brake B1 with the rotary member MB of the first sun gear S1, through a second brake B2 with the rotary member MD of the second ring gear R2, and through a third brake B3 with the rotary member ME of the second sun gear S2.

The gear system of the ninth embodiment can provide five forward speeds and one reverse speed by engaging two of the five selective engaging elements with the fine shifting quality.

Figures 27, 28:
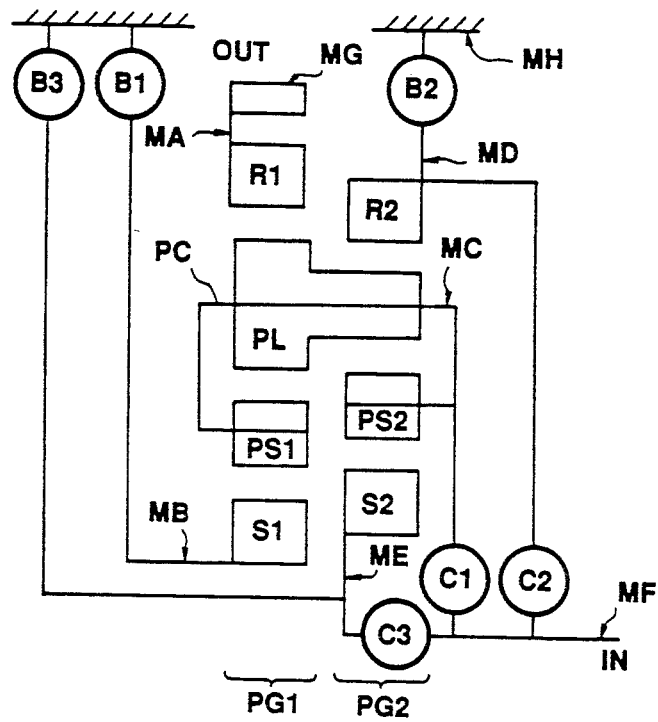
FIGS. 27 and 28 show a tenth embodiment of the invention in skeleton diagram and logic table.

A TENTH EMBODIMENT of the invention is shown in FIGS. 27 and 28. The gear train of the tenth embodiment belongs to the WW-W category, and is identical in type to the gear train of the eighth embodiment shown in FIG. 23.

In the tenth embodiment, the output gear MG is directly connected with the member MA of the first ring gear R1. The input shaft MF is connected through a first clutch C1 with the rotary member MC of the common carrier PC, through a second clutch C2 with the rotary member MD of the second ring gear R2, and through a third clutch C3 with the rotary member ME of the second sun gear S2. The housing member MH is connected through a first brake B1 with the rotary member MB of the first sun gear S1, through a second brake B2 with the rotary member MD of the second ring gear R2, and through a third brake B3 with the rotary member ME of the second sun gear S2.

The gear system of the tenth embodiment can provide five forward speeds and one reverse speed by engaging two of the six selective engaging elements with the fine shifting quality.

Figure 29:
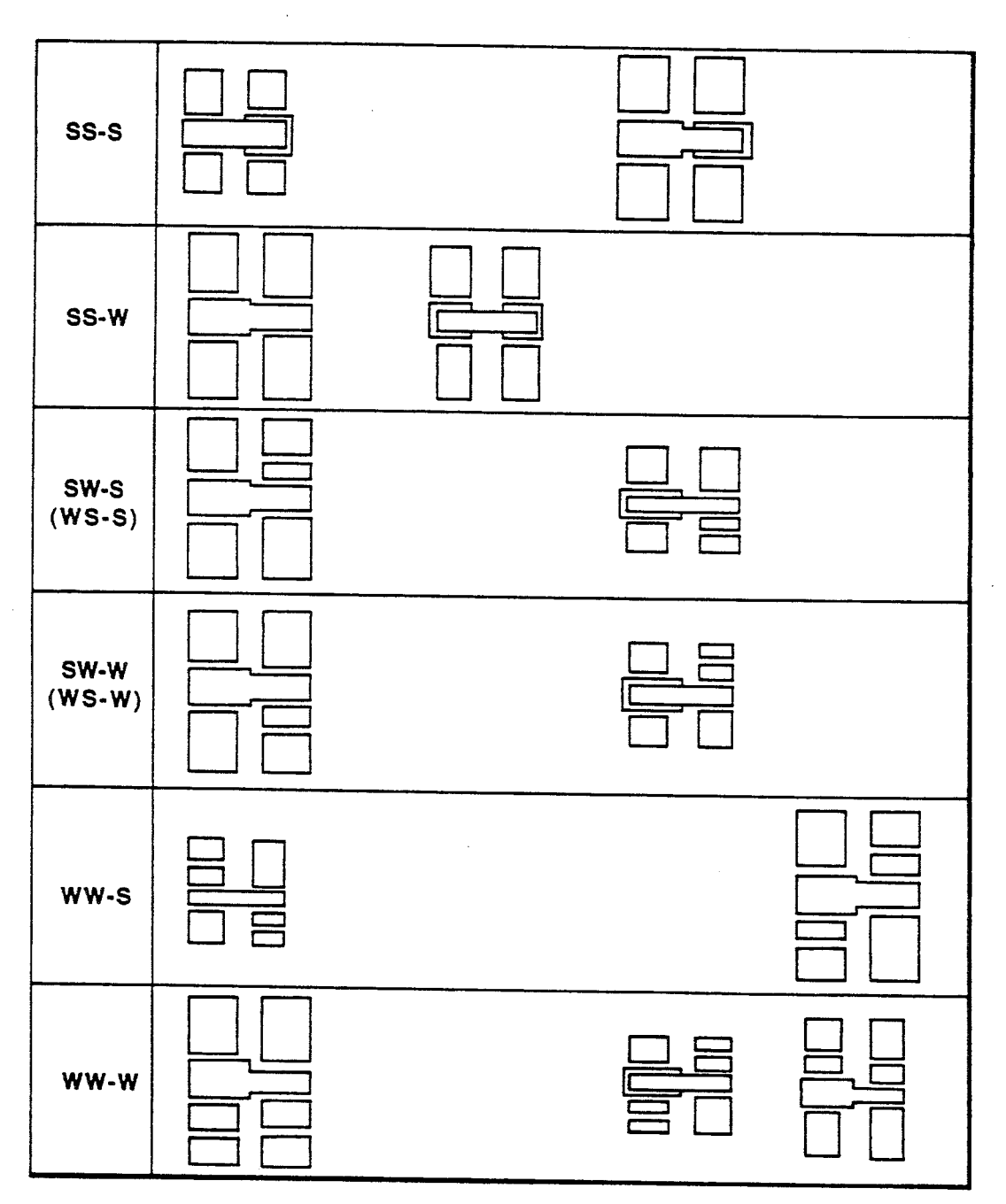

FIG. 29 shows the various planetary gear train types according to the present invention which are advantageous in that the number of pinions of different kinds participating in torque transmission is equal to or smaller than two in each of the first and second planetary gear sets PG1 and PG2. The reduction of the number of pinions contributes to reduction in manufacturing cost, gear noise, efficiency in power transmission and friction.

For example, the gear train shown in FIG. 19 belongs to the WW-W category as shown in FIG. 29. In the first planetary gear set PG1 shown in FIG. 19, the first ring gear R1 and the first sun gear S1 are connected with each other by a first pinion drive path consisting of the first portion of the long pinion PL and the first short pinion PS1 in such a manner that torque can be transmitted between the first ring and sun gears through the first pinion drive path. Similarly, the second ring gear R2 and the second sun gear S2 of the second planetary gear set PG2 are connected by a second pinion drive path consisting of the second portion of the long pinion PL and the second short pinion PS2. In the gear train of FIG. 19, the number of pinions (that is, the number of pinions of each pinion group) is two in each of the first and second planetary gear sets PG1 and PG2. In the third equivalent planetary gear set PG3, the first and second ring gears R1 and R2 are connected by a third pinion drive path consisting of the long pinion PL alone. The number of pinions is one in the third gear set PG3. It is convenient to call this gear train type on (221) type.

FIG. 29 shows a pinion set of each of the thirteen gear train types classified into the six categories. The pinion set of each type may consist of only one long pinion, or may be a collection of one long pinion and one or more short pinions, as shown in FIG. 29. The pinion set of each type contains a first pinion subset serving as a first intermediate gearing means for connecting by gearing the first ring gear R1 and the first sun gear S1 in the first planetary gear set PG1, a second pinion subset serving as a second intermediate gearing means for connecting by gearing the second ring gear R2 and the second sun gear S2 in the second planetary gear set PG2, and a third pinion subset serving as a third intermediate gearing means for connecting by gearing the first and second ring gears R1 and R2. In the basic type of the WW-W category, for example, the pinion set consists of one long pinion and two short pinions, so that the cardinal number of the pinion set is three. In general, the cardinal number (cardinality) of a set is the number of elements of the set. The first subset consists of the long pinion and the first short pinion. The second subset consists of the long pinion and the second short pinion. The third subset consists of the long pinion. In any of the types shown in FIG. 29, the cardinal number of each of the first and second pinion subsets is not greater than two, and the cardinal number of the third subset is not greater than three.

Figures 30, 31:
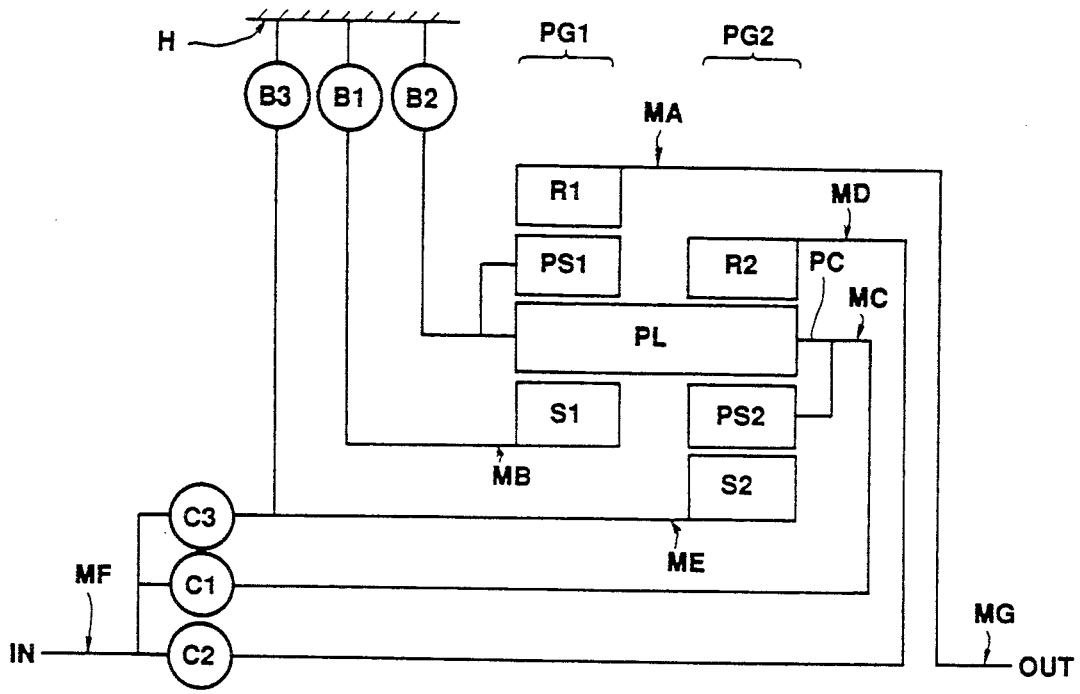
FIGS. 30 and 31 show an eleventh embodiment of the invention in skeleton diagram and logic table.

AN ELEVENTH EMBODIMENT of the invention is shown in FIG. 30.

The gear train of the eleventh embodiment has the first and second ring gears R1 and R2, the first and second sun gears S1 and S2, and the common carrier PC, as in the preceding embodiments.

The pinion unit of the eleventh embodiment has one or more pinion groups each of which includes first and second short pinions PS1 and PS2, and a stepless long pinion PL. The first short pinion PS1 meshes with the first ring gear R1, and the second short pinion PS2 meshes with the second sun gear S2. The long pinion PL has a first toothed portion which meshes with both the first short pinion PS1 and the first sun gear SL, and a second toothed portion which meshes with both the second ring gear R2 and the second short pinion PS2. The diameter of the first portion is equal to that of the second portion.

The rotary member MC of the common carrier PC is connected with the input shaft MF by a member connecting means which includes a first clutch C1. The rotary member MD of the second ring gear R2 is connected with the input shaft MF by a member connecting means which includes a second clutch C2. The rotary member ME of the second sun gear S2 is connected with the input shaft MF by a member connecting means which includes a third clutch C3. The rotary member MB of the first sun gear S1 is connected with the housing member MH by a member connecting means which includes a first brake B1. The rotary member MC of the common carrier PC is connected with the housing member MH by a member connecting means which includes a second brake B2. The rotary member ME of the second sun gear S2 is connected with the housing member MH by a member connecting means which includes a third brake B3. The rotary member MA of the first ring gear R1 is directly connected with the output member MG in the form of an output shaft by an output member connecting means which includes no selective engaging element.

The output member MG of the eleventh embodiment is in the form of a shaft, and arranged in line with the input shaft MF so that the axes of the input and output shafts MF and MG are collinear with each other. The input shaft MF projects in one direction from one end of the gear housing MH, and the output shaft MG projects axially in the opposite direction from the other end of the housing MH. This arrangement is herein called a terminal output arrangement as distinguished from an intermediate output arrangement such as the arrangement shown in FIG. 1 having the output gear.

The planetary gear system of the eleventh embodiment provides six forward speeds including one direct speed, and one reverse speed by engaging two of the six selective engaging elements with satisfactory shift feeling.

The terminal output arrangement employed in the eleventh embodiment is advantageous in that this arrangement is applicable to not only front engine front drive vehicles but also front engine and rear drive vehicles.

FIGS. 32–42 shows various types of the terminal output arrangements which can be employed in the present invention. In these figures, the letters A, B, C, D and E are used to denote, respectively, the first ring gear R1, the first sun gear S1, the common carrier PC, the second ring gear R2 and the second sun gear S2. In the following description, the first member M1 is the input member, the second member M2 is the output member, the third member M3 is the housing member, and the sixth member M3 is the rotary member of the common carrier PC. The four rotary gear members A, B, E and D of the first ring gear R1, the first sun gear S1, the second sun gear S2 and the second ring gear R2 are, respectively, M4, M5, M7 and M8, or M8, M4, M5 and M7, or M7, M8, M4 and M5, or M5, M7, M8 and M4. In other words, any one of the four rotary gear members A, B, E and D is the fourth member M4. The rotary gear member which is next to the fourth member M4 in the order of (A, B, E, D) is the fifth member M5. When the member D is the fourth member M4, then the member A is the fifth member. The rotary gear member which is next to the fifth member M5 in the order is the seventh member M7. When the member D is the fifth member M5, then the member A is the seventh member M7. The rotary gear member next to the seventh member M7 is the eighth member M8. When the member D is the seventh member M7, then the member A is the eighth member M8.

Figure 32:
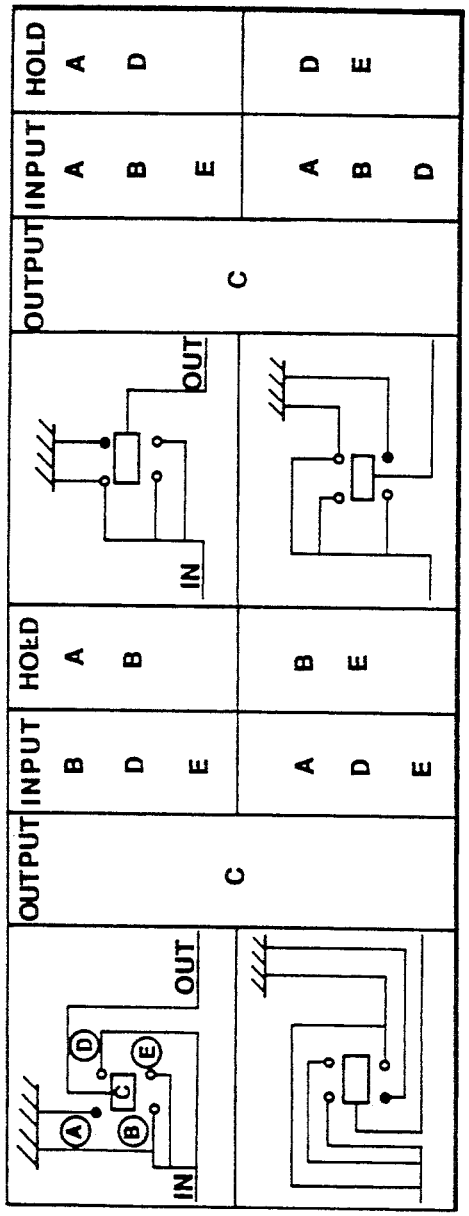

In the four configurations shown in FIG. 32, there are six member connecting means connecting the following six member pairs; M1–M4, M1–M5, M1–M7, M3–M4, M3–M8 and M2–M6. In the configuration shown in the left upper corner in FIG. 32, for example, the rotary member B of the first sun gear S1 is the fourth member M4, the rotary member E of the second sun gear S2 is the fifth member M5, the rotary member D of the second ring gear R2 is the seventh member M7, and the rotary member A of the first ring gear R1 is the eighth member M8.

Figure 33:
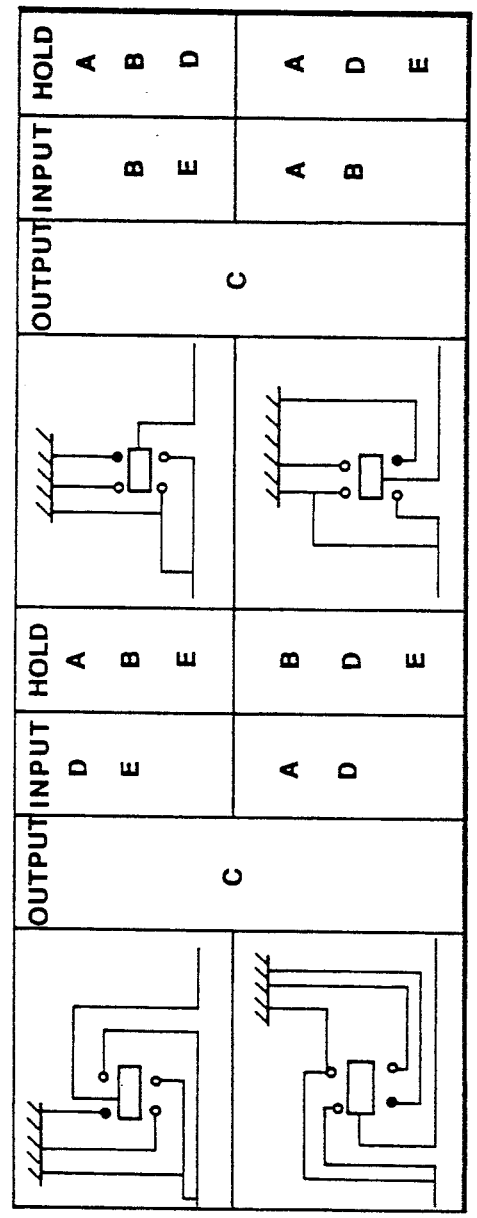
Figure 34:
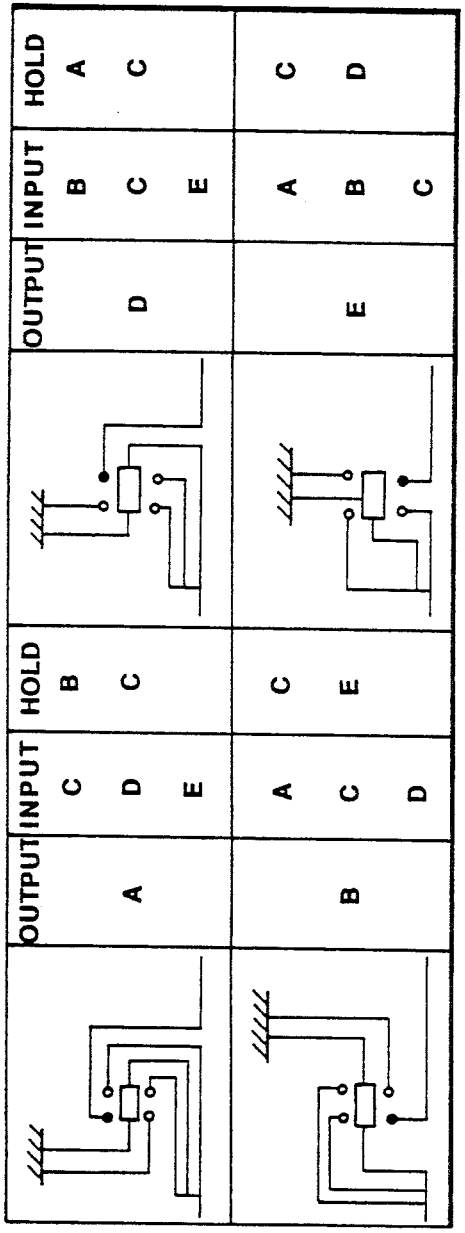
Figure 35:
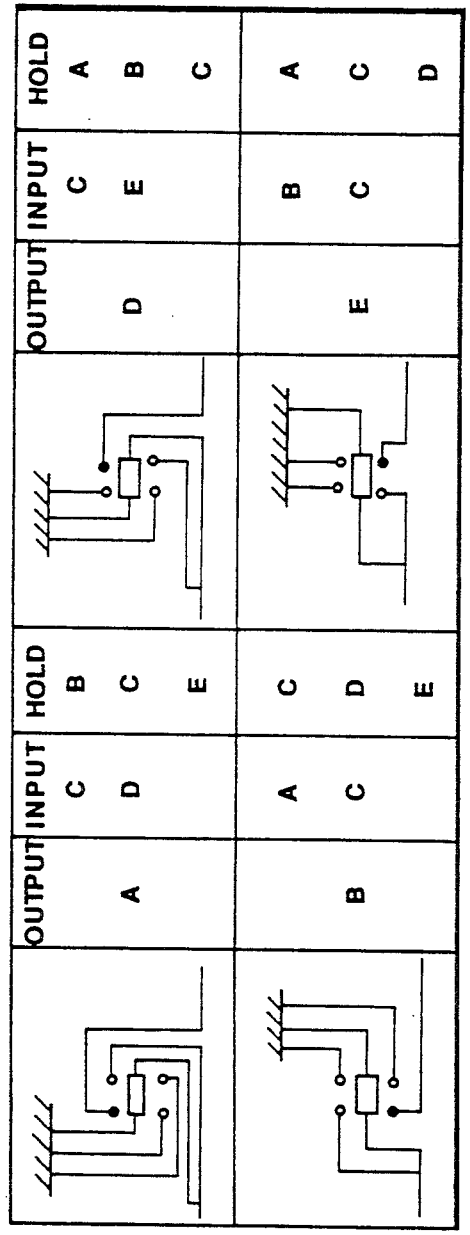
Figure 36:
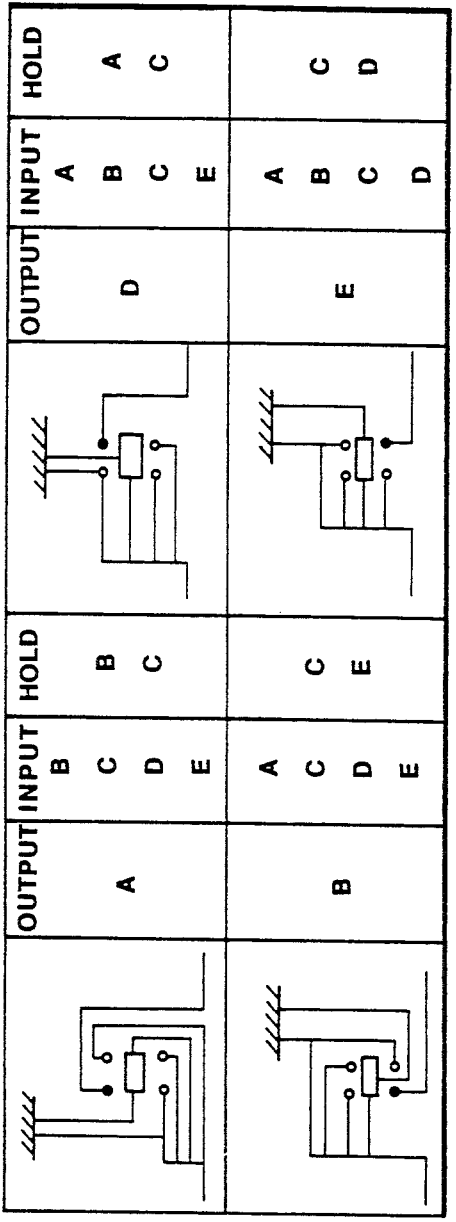
Figure 37:
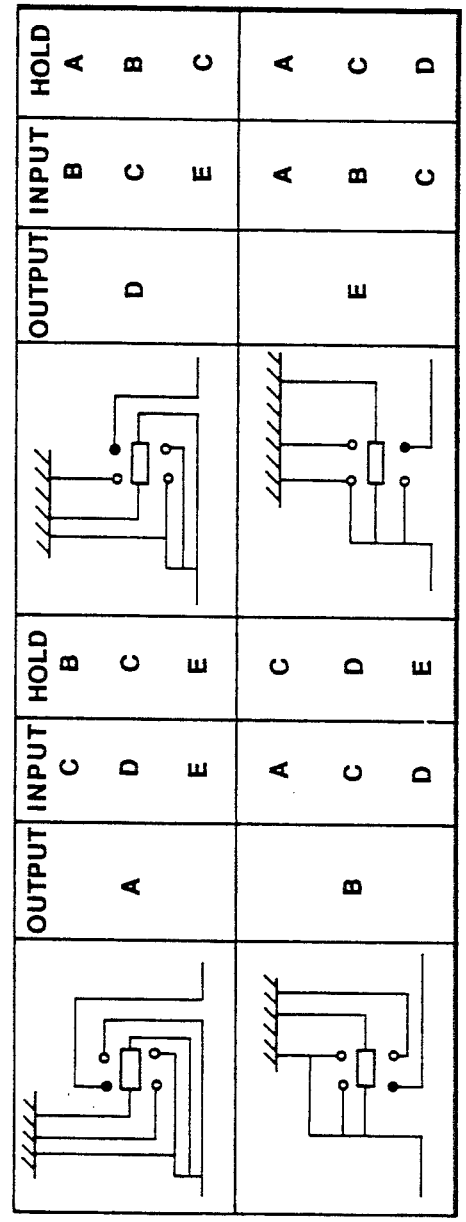
Figure 38:
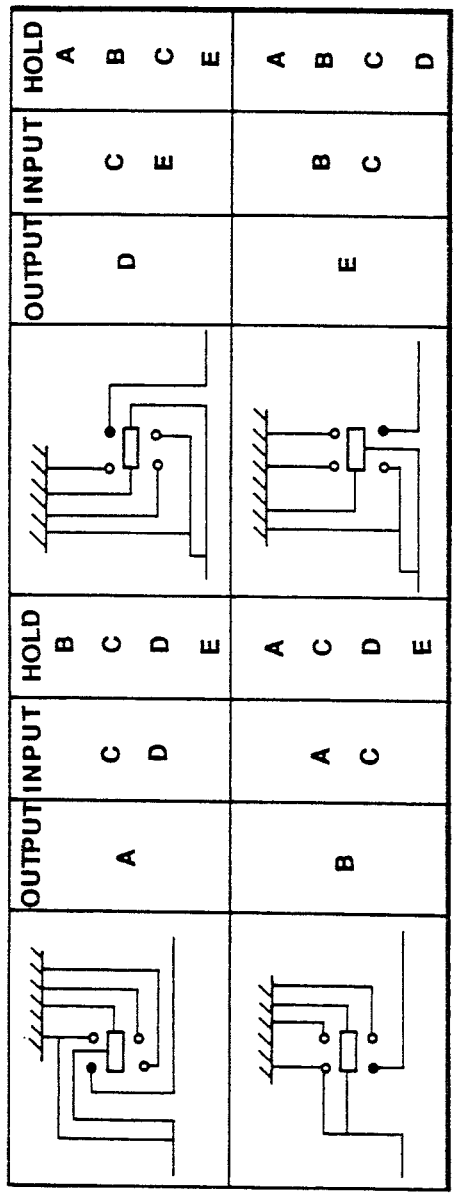
Figure 39:
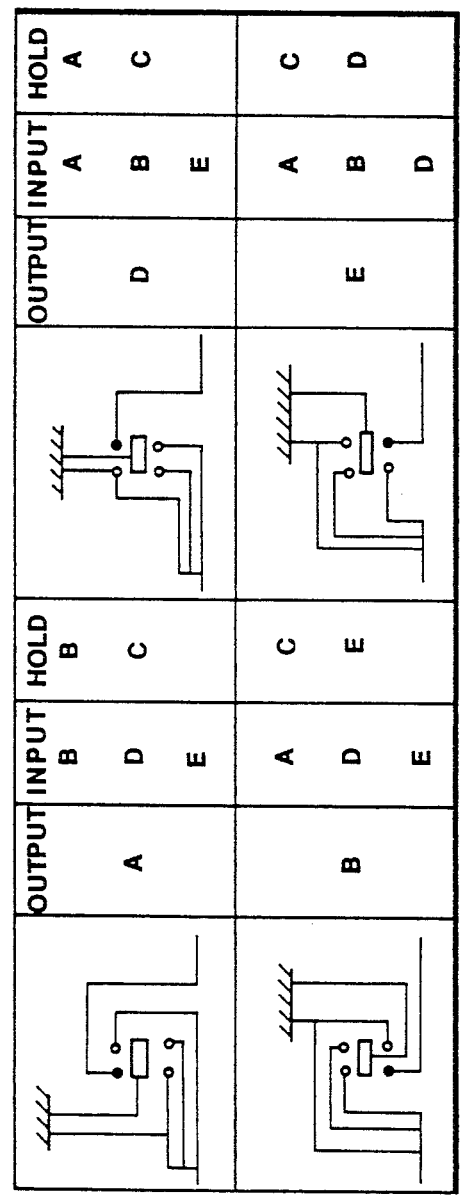
Figure 42:
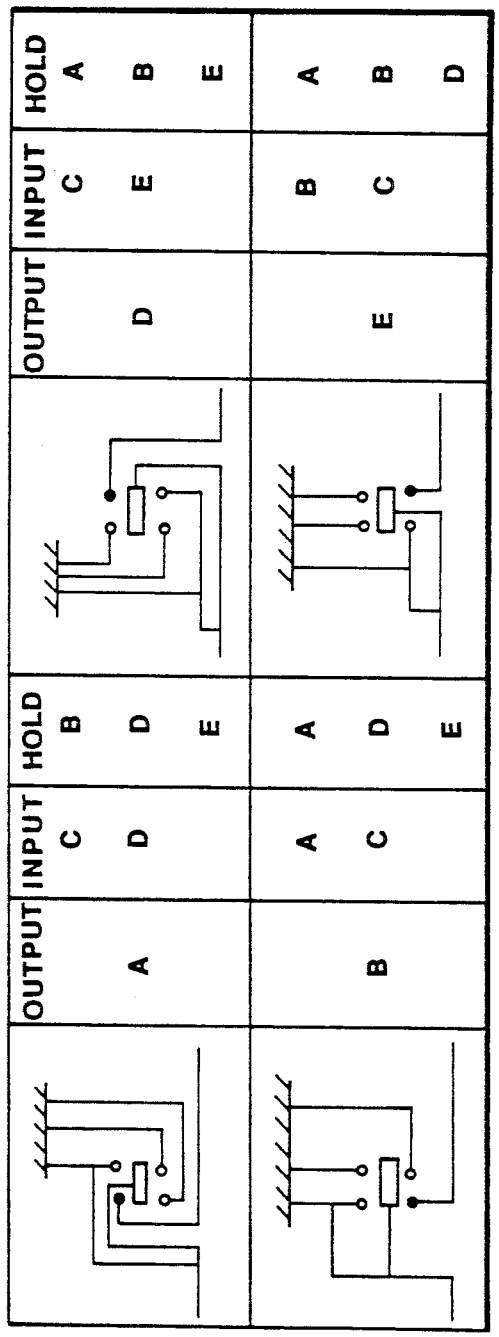

In the four configurations shown in FIG. 33, a connection is made between the two members of each of the six member pairs, M1–M5, M1–M7, M3–M4, M3–M5, M3–M8 an M2–M6. In each configuration shown in FIG. 34, there are provided six connecting means for six member pairs, M1–M5, M1–M7, M1–M6, M3–M4, M3–M6 and M2–M8. In FIG. 35, the connected member pairs are M1–M7, M1–M6, M3–M4, M3–M5, M3–M6 and M2–M8. In FIG. 36, the connected pairs are M1–M4, M1–M5, M1–M7, M1–M6, M3–M4, M3–M6 and M2–M8. In FIG. 37, the connected pairs are M1–M5, M1–M7, M1–M6, M3–M5, M3–M4, M3–M6 and M2–M8. In FIG. 38, the connected pairs are M1–M7, M1–M6, M3–M5, M3–M7, M3–M4, M3–M6 and M2–M8. In FIG. 39, the connected pairs are M1–M4, M1–M5, M1–M7, M3–M4, M3–M6, and M2–M8. In FIG. 40, the connected pairs are M1–M5, M1–M7, M3–M4, M3–M5, M3–M6 and M2–M8. In FIG. 41, the connected pairs are M1–M5, M1–M7, M1–M6, M3–M5, M3–M4 and M2–M8. In FIG. 42, the connected pairs are M1–M7, M1–M6, M3–M5, M3–M4, M3–M7 and M2–M8.

In each of these configurations shown in FIGS. 32-42, the output shaft M2 is connected to only one rotary member M6 or M8, and there are provided six or seven connecting means. However, it is possible to reduce the number of the connecting means as long as each of the five rotary members is connected at least one of the input, output and housing members.

The gear system of each of these configurations has at least five connecting means each of which connects a unique one of the five rotary members with one of the three external members which are the input, output and housing members. One of the five connecting means is an output connecting means which connects one of the five rotary members with the output member, and the remaining four are input or housing connecting means. At least one connecting means is the input connecting means connecting one rotary member with the input member, and at least one is the housing connecting means connecting one rotary member with the housing member. The output connecting means is disposed between one input connecting means and one housing connecting means. When there are two or more input connecting means, they are arranged consecutively without interposition of any other connecting means. When there are two or more housing connecting means, they are arranged consecutively without interposition of any other connecting means.

Each of the planetary gear system shown in FIGS. 32-42 has a member connecting means for connecting each rotary member of a five rotary member set which is a set consisting of the four rotary gear members of the first and second sun gears S1 and S2 and the first and second ring gears R1 and R2, and the rotary carrier member, with at least one of the input, output and housing members. This member connecting means includes an input connecting means which connects the input member with a driving member subset which is a nonnull subset of the rotary member set, a housing connecting means which connects the housing member with a held member subset which is a non-null subset of the rotary member set, and an output connecting means which connects the output shaft with a driven member subset which is a non-null subset of the rotary member set. The driven member subset consists of only one rotary member, so that its cardinal number is one. The driven member subset intersects neither the driving member subset, nor the held member subset. That is, there is no rotary member which is in both the driven member subset and the driving member subset, and there is no rotary member which is in both the driven member subset and the held member subset. If the driving member subset includes two or more rotary gear members, then all the rotary gear members of the subset are consecutive in such a cyclic order (an arrangement of cyclic permutation) that the first ring gear member is next to the second ring gear member, the first sun gear member is next to the first ring gear member, the second sun gear member is next to the first sun gear member and the second ring gear member is next to the second sun gear member. Similarly, if the held member subset includes two or more rotary gear members, then all the rotary gear members of the subset are consecutive in the cyclic order. The cardinal number of an intersection of the driving member subset and the held member subset is zero or one, and not greater than one.

In each of the arrangements shown in FIG. 32, the input connecting means connects the input shaft with each rotary gear member of the driving member subset which consists of three rotary gear members which are consecutive in the cyclic order, and the housing connecting means connects the housing member with each rotary gear member of the held member subset which consists of two rotary gear members which are consecutive in the cyclic order. In each of the arrangements shown in FIG. 33, the driving member subset includes two consecutive rotary gear members, and the held member subset includes three consecutive rotary gear members. In each of the arrangements shown in FIG. 34, the driving member subset includes two consecutive rotary gear members, and the held member subset includes only one rotary gear member in addition to the carrier member. In FIG. 35, the driving member subset includes only one rotary gear member, and the held member subset includes two consecutive rotary gear members. In FIG. 36, the driving member subset includes three consecutive rotary gear members, and the held member subset includes only one rotary gear member. In FIG. 37, the driving member subset includes two consecutive rotary gear members, and the held member subset includes two consecutive rotary gear members. In FIG. 38, the driving member subset includes only one rotary gear member, and the held member subset includes three consecutive rotary gear members. In FIG. 39, the driving member subset includes three consecutive rotary gear members, and the held member subset includes only one rotary gear member. In FIG. 40, the driving member subset includes two consecutive rotary gear members, and the held member subset includes two consecutive rotary gear members. In FIG. 41, the driving member subset includes two consecutive rotary gear members and the held member subset includes two consecutive rotary gear members. In FIG. 42, the driving member subset includes only one rotary gear member, and the held member subset includes three consecutive rotary gear members. The single member of the driven member subset is the carrier member C in FIGS. 32 and 33, and any one of the four rotary gear members in FIGS. 34-42. In FIGS. 34-38, the carrier member C is included in both the driving member subset and the held member subset. In FIGS. 39-42, the carrier member C is included in either the driving member subset or the held member subset.

A TWELFTH EMBODIMENT of the invention is shown in FIGS. 43-46.

The planetary gear train of the twelfth embodiment has the first and second ring gears R1 and R2, the first and second sun gears S1 and S2, and the common carrier PC, as in the preceding embodiments and their variations.

The pinion unit of the twelfth embodiment has one or more pinion groups each of which includes first and second short pinions PS1 and PS2, and a stepless long pinion PL. The pinions are all carried on the common carrier PC. The first pinion PS1 meshes with the first ring gear R1, and the second short pinion PS2 meshes with the second sun gear S2. The long pinion PL has a first toothed portion which meshes with both the first short pinion PS1 and the first sun gear S1, and a second toothed portion which meshes with both the second ring gear S2 and the second short pinion PS2. The diameter of the first portion is equal to the diameter of the second portion.

Each of the five rotary members is connected with at least one of the three external members MF, MG and MH. The gear system of the twelfth embodiment has three input connecting means, three housing connecting means, and one output connecting means.

A first input connecting means connects the input shaft MF with the rotary member MC of the common carrier PC. The first input connecting means includes a high clutch Hi/C (first clutch). The input shaft MF is further connected with the rotary member MD comprising the second ring gear R2 by a second input connecting means which includes an even clutch EVEN/C (second clutch). The input shaft MF is further connected with the rotary member ME of the second sun gear S2 by a third input connecting means which includes a low and reverse clutch L&R/C (third clutch). The third input connecting means further includes a low and reverse one-way clutch L&R/OWC which is connected in series with the low and reverse clutch L&R/C. Therefore, the rotary member ME is connected with the input shaft MF through the series combination of the low and reverse clutch and one-way clutch L&R/C and L&R/OWC.

The stationary housing member MH is connected with the rotary member MA of the first sun gear S1 by a first housing connecting means which includes an underdrive brake UD/B (first brake). The housing member MH is further connected with the rotary member MC of the common carrier PC by a second housing connecting means which includes a reverse brake Rev/B second brake). The housing member MH is further connected with the rotary member ME of the second sun gear S2 by a third housing connecting means which includes an overdrive brake OD/B (third brake).

The first housing connecting means further includes an underdrive one-way clutch UD/OWC which is connected in series with the underdrive brake UD/B, and an overrun brake OVR/B (fourth brake) which is connected in parallel with the series combination of the underdrive brake UD/B and the underdrive one-way clutch UD/OWC.

Figure 43:
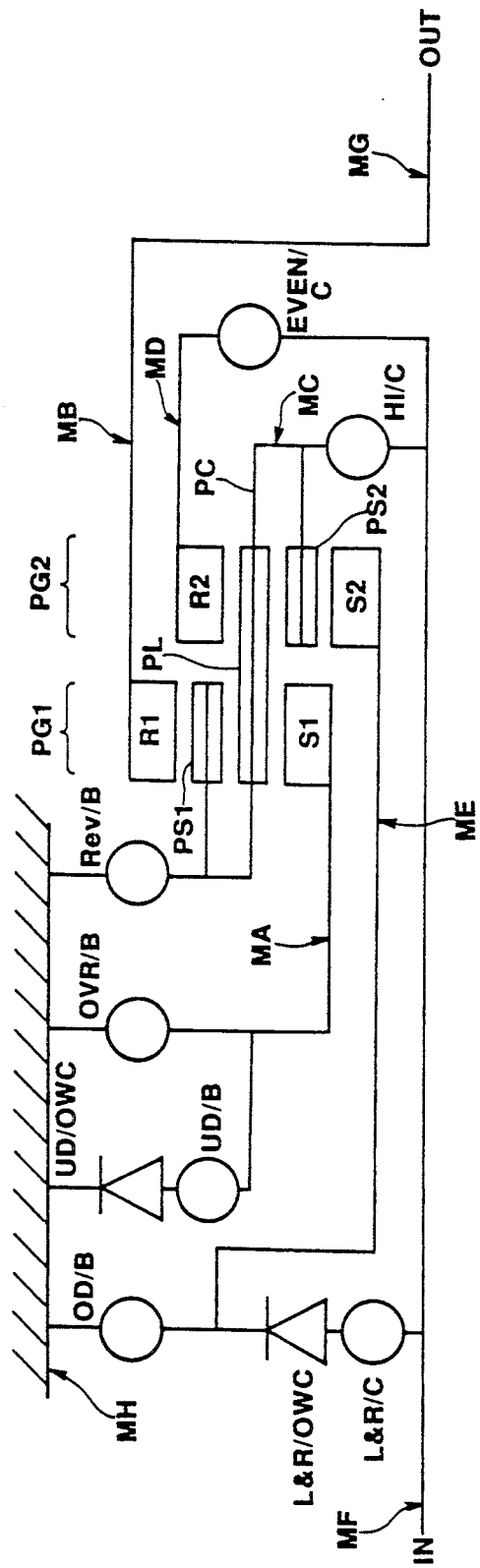

The output shaft MG is directly connected with the rotary member MB of the first ring gear R1 by the output connecting means having no selective engaging element. The output shaft MG is in line with the input shaft MF. The arrangement shown in FIG. 43 is a type of the terminal output arrangement.

Oil passages connect the three clutches Hi/C, EVEN/C and L&R/C and the three brakes UD/B, Rev/B and OD/B with the transmission shift control unit (or A/T control unit) which can control the engagement and disengagement of these elements in accordance with the driver's select operation, and one or more vehicle operating conditions.

Figure 44:
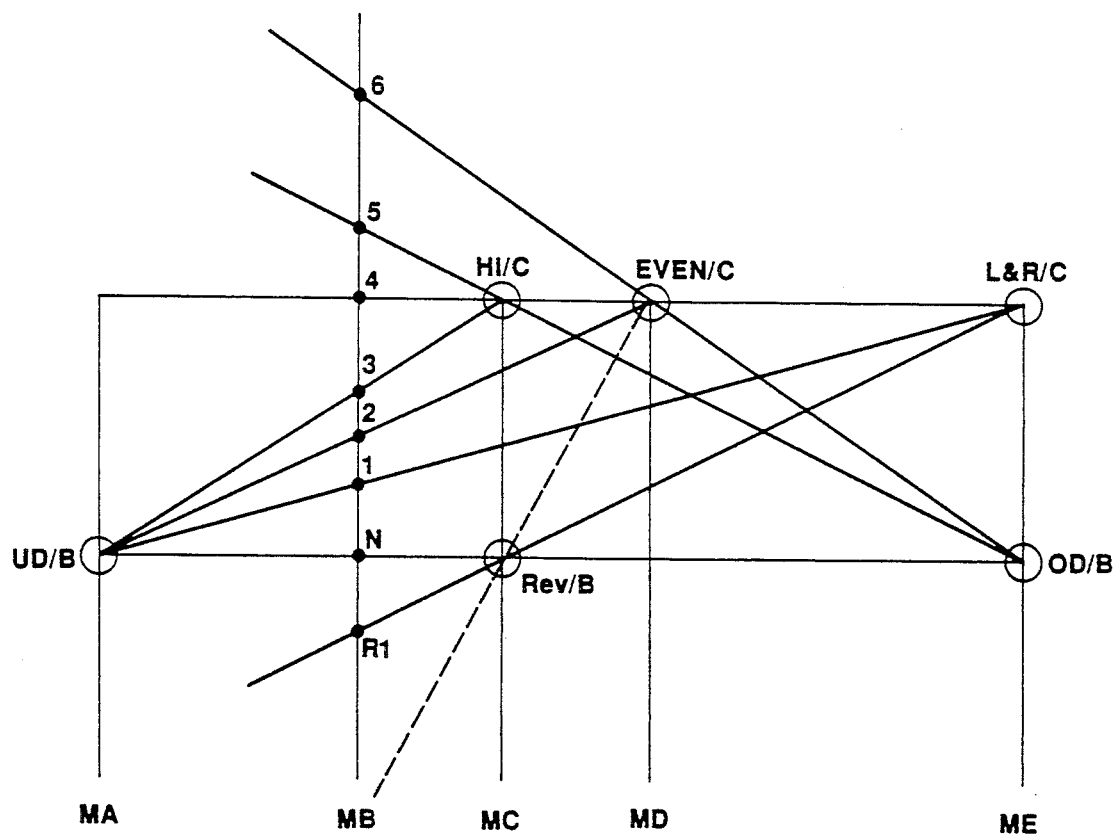

The planetary gear system of the twelfth embodiment is operated as follows:

As shown in FIG. 44, the shift control unit produces each speed by engaging two elements selected out of the six selective engaging elements Hi/C, EVEN/C, L&R/C, UD/B, Rev/B and OD/B, and thereby imposing two constraint conditions on the planetary gear train.

In the diagram shown in FIG. 44, the positions of the five rotary members MA, MB, MC, MD and ME are assigned along a horizontal axis according to the ratios of the numbers of gear teeth, and the speed ratio (which is a ratio of the rotational speed of each rotary member to the rotational speed of the input member) is expressed along a vertical axis. The clutches are positioned, respectively, at three points at which a horizontal line corresponding to a direct drive speed ratio intersects a vertical line passing through the position of the member MC, a vertical line passing through the position of the member MD and a vertical line passing through the position of the member ME. The brakes are positioned, respectively, at three points at which a horizontal line corresponding to a null speed ratio intersects a vertical line of the member MA, a vertical line of the member MC and a vertical line of the member ME. Straight lines connecting the positions of two of the selective engaging elements are speed relationship lines. A vertical line passing through the position of the member MB directly connected with the output shaft MG intersects the speed relationship line of each speed at a point indicating the reciprocal of the gear ratio of the output shaft MG. By engaging two of the selective engaging elements, the shift control unit can provide three underdrive speeds, two overdrive speeds, and two reverse speeds, as shown by the seven oblique relationship lines. This embodiment, however, employs only one reverse speed shown by a solid line, and does not employ the second reverse speed shown by a broken line in consideration of the gear ratio and the increased member speed.

As shown in the logic table of FIG. 45, the gear system of the twelfth embodiment provides six forward speeds including one direct drive speed, and one reverse speed, and achieves a shift from each forward speed to the next higher or lower speed smoothly with a good shift feeling only by changing one selective engaging element from the engaged state to the disengaged state and changing another selective engaging element from the disengaged state to the engaged state.

When a driver's control lever is put in a reverse select position to drive the vehicle backward, the shift control unit engages the low and reverse clutch L&R/C to connect the input shaft MF to the rotary member ME of the second sun gear S2, and engages the reverse brake Rev/B to hold the rotary member MC of the common carrier PC to the housing member MH.

In a drive performance mode in which the input shaft MF drives the planetary gear train, the low and reverse one-way clutch L&R/OWC is put into action, and power is transmitted from the input shaft MF to the output shaft MG through a power path shown by a thick lines and hatched shapes in the uppermost skeleton diagram (a) of FIG. 46. In a coast performance mode in which the output shaft MG drives the planetary gear train, the low and reverse one-way clutch L&R/OWC prevents engine braking by freewheeling. In the reverse position, the gear ratio is given by $-k/a_2$.

The neutral position can be obtained by engaging at least one of the brakes UD/B, Rev/B and OD/B. When the control lever is in the neutral select position, however the shift control unit of the twelfth embodiment puts the gear train in neutral by engaging the low and reverse clutch L&R/C in order to reduce the number of the selective engaging elements which must be switched on or off when the control lever is moved between the reverse position and the neutral position, or between the drive position and the neutral position. When the vehicle is coasting with the control lever in the neutral select position, the low and reverse one-way clutch L&R/OWC rotates freely and prevents engine braking.

When the control lever is in one of forward drive positions to select "D" range (automatic shifts up to the sixth speed), "4" range (automatic shifts up to the fourth speed), "3" range (automatic shifts up to the third speed), and "2" range (automatic shifts up to the second speed), the gear system is operated as follows:

The transmission shift control unit produces the first forward speed by engaging the low and reverse clutch L&R/C to drive the rotary member ME of the second sun gear S2, and engaging the underdrive brake UD/B to fix the rotary member MA of the first sun gear S1 to the housing member MH. When the power glow is in the normal direction of drive performance, and the gear system is in the first speed position, the low and reverse one-way clutch L&R/OWC and the underdrive one-way clutch UD/OWC come into operation, and power is transmitted from the input shaft MF to the output shaft MG through a power path shown by thick lines and hatched shapes in (b) of FIG. 46. When the power flow is reverse because of coast performance, the low and reverse one-way clutch L&R/OWC and the underdrive one-way clutch UD/OWC rotate without transmitting torque, and thereby prevent the braking effect of the engine.

In the first speed position within the "4" range or the "3" range, the overrun brake OVR/B is engaged when the throttle opening degree TVO is equal to or smaller than 1/16. In this case, however, the engine brake does not come into operation. In the first speed position of the "2" range, the overrun brake OVR/B is engaged irrespective of the throttle opening degree TVO, but no braking effect of the engine is produced.

The gear ratio of the first speed is $[\alpha_1 k + \alpha_2]/[\alpha_2(-1-\alpha_1)]$.

In the second forward speed, the shift control unit connects the input member MF to the rotary member MD of the second ring gear R2 by engagement of the even clutch EVEN/C, and holds the rotary member MA of the first sun gear S1 to the housing member MH by engagement of the underdrive brake UD/B. Therefore, in the drive performance mode of the normal power flow, power is transmitted from the input shaft MF to the output shaft MG through a power path shown at (c) of FIG. 46, by the aid of the underdrive one-way clutch UD/OWC. During coasting, the underdrive one-way clutch UD/OWC rotates without torque transmission and prevents the engine braking.

When the throttle opening TVO is equal to or smaller than 1/16 in the second speed within the "4" range or the "3" range, the overrun brake OVR/B is engaged, and the engine braking comes into operation. In the second speed position of the "2" range, the overrun brake OVR/B is engaged without regard to the throttle opening, and the engine braking effect is produced.

The gear ratio in the second forward speed is given by $(1+\alpha_1 k)/(1-\alpha_1)$.

The shift control unit produces the third forward speed by connecting the input member MF to the rotary member MC of the common carrier PC by engagement of the high clutch Hi/C, and holds the rotary member MA of the first sun gear S1 to the housing member MH by engagement of the underdrive brake UD/B. The power path is shown at (d) of FIG. 46. The underdrive one-way clutch UD/OWC is in operation during driving with the normal power flow, and prevents the engine braking by idling during coasting with the reverse power flow.

In the third speed position within the "4" range or "3" range, the overrun brake OVR/B is engaged to apply the engine brake when the throttle opening TVO is equal to or smaller than 1/16.

The gear ratio of the third speed is given by $1/(1-\alpha_1)$.

The fourth (direct drive) speed can be obtained by directly connecting the input and output shaft MF and MG by engagement of any two of the clutches Hi/C, EVEN/C and L&R/C. The shift control unit of the twelfth embodiment produces the direct drive speed by engaging the high clutch Hi/C and the even clutch EVEN/C in consideration of the shift quality in 3-4 and 4-5 upshifts and downshifts. The power path in the fourth forward speed is shown at (e) of FIG. 46.

In the fifth forward speed, the high clutch Hi/C makes the driving connecting between the input member MF and the rotary member MC of the common carrier PC, and the overdrive brake OD/B holds (or grounds) the rotary member ME of the second sun gear S2 to the stationary housing member MH. The torque path in the fifth speed is shown at (f) of FIG. 46. The gear ratio is $k/(k+\alpha_2)$.

In the sixth forward speed, the even clutch EVEN/C connects the input shaft MF to the rotary member MD of the second ring gear R2, and the overdrive brake OD/B holds the rotary member ME of the second sun gear S2 to the housing member MH. The torque path is shown at (g) of FIG. 46. The gear ratio is $k(1-\alpha_2)/(k+\alpha_2)$.

The planetary gear system of the twelfth embodiment has the following advantages. First, this gear system requires only two ring gears and only two sun gears, so that it enables us to reduce the size, weight and manufacturing cost of the gear train. Especially, it is possible to considerably reduce the axial length of the gear train. Second, this gear system can provide six forward speeds and two reverse speeds. When only one reverse speed is employed as in the twelfth embodiment, it is possible to improve the durability of the rotary members. Third, each of the first and second planetary gear sets PG1 and PG2 can transmit torque by using only two pinions meshing with each other, one further meshing with the ring gear, and the other further meshing with the sun gear. Therefore, this gear system can reduce the gear noise and improve the durability of the pinions by restraining the pinion speed from increasing too much. Fourth, the members are connected so that power can be taken out from the end of the transmission case or housing. Therefore, the gear system is applicable to vehicles of various types, including FR vehicles and FF vehicles. Fifth, the low and reverse one-way clutch L&R/OWC connected in series with the low and reverse clutch L&R/C is able to prevent the drivability from being made worse by the braking effect of the engine in the reverse and the first forward speed. Sixth, the arrangement of the underdrive brake UD/B, the underdrive one-way clutch UD/OWC and the overrun brake OVR/B can improve the quality of shifting by providing free wheel shift (or one-way clutch shift) with smooth shift timing especially when the magnitude of transmission torque is great as in shifts between the first and second speeds. Seventh, each speed is obtained by engaging two elements selected among the clutches Hi/C, EVEN/C and L&R/C and the brakes UD/B, Rev/B and OD/B, and each shift from one speed to next is accomplished by using only a small number of selective engaging elements, so that it is easy to mitigate shift shock and improve the quality of shifting.

In the diagram of FIG. 44, the positions of the rotary members along the horizontal line are determined so as to satisfy the following equations; $A/(1+A) = Z_{s1}/Z_{r1}$, $B/(B+C) = Z_{s2}/Z_{r2}$ where the ratio of a first horizontal distance between the positions of the members MA and MB to a second horizontal distance between the positions of the members MB and MC is 1:A, the ratio of the first distance to a third distance between the positions of MC and MD is 1:B and the ratio of the first distance to a fourth distance between the positions of MD and ME is 1:C.

What is claimed is:

1. A planetary gear system comprising:

first and second ring gears;

first and second sun gears;

a common planet carrier which serves as a first carrier constituting a first planetary gear set with said first ring gear and said first sun gear, and as a second carrier constituting a second planetary gear set with said second ring gear and said second sun gear;

a pinion means which is rotatably supported on said common carrier and which connects by gearing said first ring gear and said first sun gear with each other, and said second ring gear and said second sun gear with each other, said pinion means comprising a long pinion having a first toothed portion meshing with at least one component of said first planetary gear set, and a second toothed portion meshing with at least one component of said second planetary gear set;

wherein said first ring gear, said first sun gear, said second ring gear, said second sun gear and said common carrier form, respectively, a rotary first ring gear member, a rotary first sun gear member, a rotary second ring gear member, a rotary second sun gear member and a rotary carrier member which can rotate relative to one another;

wherein each of said first and second planetary gear sets is a double pinion type planetary gear set, and each of said first and second ring gears is geared by said pinion means so as to form a third planetary gear set of a single pinion type;

wherein said system further comprises an input member, an output member, a stationary housing member, and a connecting means for putting said rotary members in an overdrive state to provide an overdrive speed ratio wherein an output speed is greater than an input speed by connecting each of said rotary members with one of said input, output and housing members; and wherein said first and second ring gears and said first and second sun gears are all placed between first and second imaginary planes which are both perpendicular to a common axis of said gears, and which are spaced from each other along said common axis, said first plane being located between one end of said input member and said gears, said second imaginary plane being spaced from said input member, one of said first and second ring gears being a closer ring gear, and the other of said first and second ring gears being a remoter ring gear, the closer ring gear being closer to said first imaginary plane than the remoter ring gear, and said pinion means comprises a closer outer short pinion which is in direct engagement with the closer ring gear.

2. A planetary gear system according to claim 1 wherein said connecting means comprises a carrier driving clutch which is connected between said input member and said common carrier.

3. A planetary gear system according to claim 1 wherein said long pinion is geared with said first and second ring gears, and said first and second sun gears in such a manner that said long pinion can transmit rotation between said first and second ring gears, between said first and second sun gear, between said first ring gear and said second sun gear, and between said first sun gear and said second ring gear.

4. A planetary gear system according to claim 1 wherein said pinion means comprises a first intermediate gearing means which connects by gearing said first ring gear and said first sun gear with each other, and which constrains rotations of said first ring gear, said first sun gear and said common carrier by one of a first single pinion type planetary gearing relationship and a first double pinion type planetary gearing relationship, a second intermediate gearing means which connects by gearing said second ring gear and said second sun gear with each other, and which constrains rotations of said second ring gear, said second sun gear and said common carrier by one of a second single pinion type planetary gearing relationship and a second double pinion type planetary gearing relationship, and a third intermediate gearing means which connects by gearing said first ring gear and said second ring gear, and which constrains rotations of said first and second ring gears and said common carrier by one of a third single pinion type planetary gearing relationship and a third double pinion type planetary gearing relationship, and wherein said first single pinion type relationship, said first double pinion type relationship, said second single pinion type relationship, said second double pinion type relationship, said third single pinion type relationship, and said third double pinion type relationship are expressed, respectively, by the following six equations (1), (2), (3), (4), (5) and (6);

$$Nr_1 + a_1 Ns_1 = (1 + a_1)Nc \qquad (1)$$

$$Nr_1 - a_1 Ns_1 = (1 - a_1)Nc \qquad (2)$$

$$Nr_2 + a_2 Ns_2 = (1 + a_2)Nc \qquad (3)$$

$$Nr_2 - a_2 Ns_2 = (1 - a_2)Nc \qquad (4)$$

$$Nr_1 + kNr_2 = (1 + K)Nc \qquad (5)$$

$$Nr_1 - kNr_2 = (1 - k)Nc \qquad (6)$$

where $Nr_1$ is a rotational speed of said first ring gear, $Ns_1$ is a rotational speed of said first sun gear, $Nr_2$ is a rotational speed of said second ring gear, $Ns_2$ is a rotational speed of said second sun gear, $Nc$ is a rotational speed of said common carrier, $a_1$ is a ratio of the number of teeth of said first sun gear to the number of teeth of said first ring gear, $a_2$ is a ratio of the number of teeth of said second sun gear to the number of teeth of said second ring gear, and k is a coefficient which is positive said intermediate gearing means constraining the rotations of said first ring gear, said first sun gear and said common carrier by said first double pinion type planetary gearing relationship, and second intermediate gearing means constraining the rotations of said second ring gear, said second sun gear and said common carrier by said second double pinion type planetary gearing relationship, and third intermediate gearing means constraining the rotations of said first and second ring gears and said common carrier by said third single pinion type planetary gearing relationship.

5. A planetary gear system according to claim 4 wherein said pinion means comprises a first short pinion meshing with said first ring gear, and a second short pinion meshing with said second sun gear, said first portion of said long pinion meshing with both said first short pinion and said first sun gear, and said second portion of said long pinion meshing with said both said second ring gear and said second short pinion.

6. A planetary gear system according to claim 4 wherein said first intermediate gearing means of said pinion means comprises a first pinion subset which is a subset of a pinion set comprising said long pinion, and which has a cardinal number equal to or smaller than two, and said second intermediate gearing means comprises a second pinion subset which is a subset of said pinion set and which has a cardinal number equal to or smaller than two.

7. A planetary gear system according to claim 6 wherein said third intermediate gearing means of said pinion means comprises a third pinion subset which is a subset of said pinion set and which has a cardinal number equal to or smaller than three.

8. A planetary gear system according to claim 4 wherein said pinion means further comprises a first short pinion which meshes with both said first ring gear and said first sun gear and which further meshes with said first portion of said long pinion, and a second short pinion which meshes with both said second ring gear and said second sun gear and which further meshes with said second portion of said long pinion.

9. A planetary gear system according to claim 4 wherein said pinion means further comprises a first short pinion meshing with said first sun gear, and a second short pinion meshing with said second being gear, said first portion of said long pinion meshing with both said first ring gear and said first short pinion, and said second portion of said long pinion meshing with both said second short pinion and said second sun gear, the number of teeth of said first portion of said long pinion being different from that of said second portion.

10. A planetary gear system according to claim 1 wherein said system further comprises an input member taking the form of an input shaft, a stationary housing member, and an output member taking the form of an output shaft which is in line with said input shaft, and which projects axially from said housing member.

11. A planetary gear system according to claim 10 wherein said system further comprises a connecting means for connecting each rotary member of a five rotary member set consisting of said first ring gear member, said first sun gear member, said second ring gear member, said second sun gear member and said carrier member, with one of said input, output and housing members, said connecting means comprising an input connecting means which connects said input member with a driving member subset which is a non-null subset of said rotary member set, a housing connecting means which connects said housing member with a held member subset which is a non-null subset of said rotary member set, and an output connecting means which connects said output shaft with a driven member subset which is a non-null subset of said rotary member set.

12. A planetary gear system according to claim 11 wherein said members are connected by said input, housing and output connecting means in such a manner that said driven member subset consists of only one rotary member, and intersects neither said driving member subset, nor said held member subset.

13. A planetary gear system according to claim 12, wherein said input and housing members are connected with said rotary members by said input connecting means and said housing connecting means in such a manner that all of said rotary gear members included in any one of said driving member subset and said held member subset are consecutive in such a cyclic order that said first ring gear member is next to said second ring gear member, said first sun gear member is next to said first ring gear member, said second sun gear member is next to said first sun gear member, and said second ring gear member is next to said second sun gear member.

14. A planetary gear system according to claim 13 wherein said rotary members are connected with said input and housing members in such a manner that a cardinal number of an intersecton of said driving member subset and said held member subset is equal to or smaller than one.

15. A planetary gear system according to claim 14 wherein each rotary member of said driving member subset is connected with said input member through a clutch, and each rotary member of said held member subset is connected with said housing member through a brake.

16. A planetary gear system according to claim 10 wherein said system further comprises a connecting means for connecting at least one of a first member which is said input member, a second member which is said output member, and a third member which is said housing member, with each rotary member of a five rotary member set consisting of a fourth member which is any one of said first ring gear member, said first sun gear member, said second sun gear member and said second ring gear member, a fifth member which is the rotary gear member next to said fourth member in a cyclic order in which said first sun gear member is next to said first ring gear member, said second sun gear member is next to said first sun gear member, said second ring gear member is next to said second sun gear member, and said first ring gear member is next to said second ring gear member, a sixth member which is said carrier member, a seventh member which is the rotary gear member next to said fifth member in said cyclic order, and an eighth member which is the rotary gear member next to said seventh member in said cyclic order.

17. A planetary gear system according to claim 16 wherein said connecting means comprises an input connecting means which connects said first member with each of said fifth, seventh and sixth members, a housing connecting means which connects said third member with each of said fifth, fourth and sixth members, and an output connecting means which connects said second member with said eighth member.

18. A planetary gear system according to claim 16 wherein said connecting means comprises an input connecting means which connects said first member with each of said fourth, fifth and seventh members, a housing connecting means which connects said third member with each of said fourth and eighth members, and an output connecting means which connects said second member with said sixth member.

19. A planetary gear system according to claim 16 wherein said connecting means comprises an input connecting means which connects said first member with each of said fifth, and seventh members, a housing connecting means which connects said third member with each of said fourth, fifth and eighth members, and an output connecting means which connects said second member with said sixth member.

20. A planetary gear system according to claim 16 wherein said connecting means comprises an input connecting means which connects said first member with each of said fifth, seventh and sixth members, a housing connecting means which connects said third member with each of said fourth and sixth members, and an output connecting means which connects said second member with said eighth member.

21. A planetary gear system according to claim 16 wherein said connecting means comprises an input connecting means which connects said first member with each of said seventh, and sixth members, a housing connecting means which connects said third member with each of said fourth, fifth and sixth members, and an output connecting means which connects said second member with said eighth member.

22. A planetary gear system according to claim 16 wherein said connecting means comprises an input connecting means which connects said first member with each of said fourth, fifth, seventh and sixth members, a housing connecting means which connects said third member with each of said fourth and eighth members, and an output connecting means which connects said second member with said eighth member.

23. A planetary gear system according to claim 16 wherein said connecting means comprises an input connecting means which connects said first member with each of said seventh and sixth members, a housing connecting means which connects said third member with each of said fifth, seventh, fourth and sixth members, and an output connecting means which connects said second member with said eighth member.

24. A planetary gear system according to claim 16 wherein said connecting means comprises an input connecting means which connects said first member with each of said fourth, fifth and seventh members, a housing connecting means which connects said third member with each of said fourth and sixth members, and an output connecting means which connects said second member with said eighth member.

25. A planetary gear system according to claim 16 wherein said connecting means comprises an input connecting means which connects said first member with each of said fifth and seventh members, a housing connecting means which connects said third member with each of said fourth, fifth and sixth members, and an output connecting means which connects said second member with said eighth member.

26. A planetary gear system according to claim 16 wherein said connecting means comprises an input connecting means which connects said first member with each of said fifth, seventh and sixth members, a housing connecting means which connects said third member with each of said fifth and fourth members, and an output connecting means which connects said second member with said eighth member.

27. A planetary gear system according to claim 16 wherein said connecting means comprises an input connecting means which connects said first member with each of said seventh and sixth members, a housing connecting means which connects said third member with each of said fifth, fourth and seventh members, and an output connecting means which connects said second member with said eighth member.

28. A planetary gear system according to claim 1 wherein said pinion means comprises a first short pinion which meshes with said first ring gear, and a second short pinion which meshes with said second sun gear, said first portion of said long pinion meshing with both said first short pinion and said first sun gear, and said second portion of said long pinion meshing with both said second ring gear and said second short pinion, and wherein said planetary gear system further comprises an input member taking the form of an input shaft, an output member taking the form of an output shaft, a stationary housing member, and a connecting means comprising a first input connecting means which connects said carrier member with said input shaft through a first clutch, a second input connecting means which connects said second ring gear member with said input shaft through a second clutch, a third input connecting means which connects said second sun gear member with said input shaft through a third clutch, a first housing connecting means which connects said first sun gear member with said housing member through a first brake, a second housing connecting means which connects said carrier member with said housing member through a second brake, a third housing connecting means which connects said second sun gear member with said housing member through a third clutch, and an output connecting means which connects said first ring gear member directly with said output member.

29. A planetary gear system according to claim 28 wherein said gear system further comprises a shift control means which provides each of a plurality of speeds by engaging two of said clutches and brakes.

30. A planetary gear system according to claim 28 wherein said gear system further comprises a shift control means which provides each of six different forward speeds by engaging two of said clutches and brakes.

31. A planetary gear system according to claim 28 wherein said third input connecting means comprises a first one-way clutch which is connected in series with said third clutch.

32. A planetary gear system according to claim 31 wherein said first housing connecting means comprises a second one-way clutch which is connected in series with said first brake, and an additional brake which is connected in parallel to a series combination of said first brake and said second one-way clutch.

33. A planetary gear system according to claim 28 wherein said first housing connecting means comprises a one-way clutch which is connected in series with said first brake, and an additional brake which is connected in parallel to a series combination of said first brake and said one-wa clutch.

34. A planetary gear system according to claim 1 wherein said connecting means comprises a sun gear holding brake connected between said stationary member and one of said first and second sun gears.

35. A planetary gear system according to claim 1 wherein said pinion means further comprises an inner short pinion which is in direct engagement with one of said first and second sun gears and said long pinion is in direct engagement with both of said outer and inner short pinions, one of said first and second sun gears, and one of said first and second ring gears.

36. A planetary gear system according to claim 35 wherein one of said first and second ring gears is connected with said output member.

37. A planetary gear system according to claim 36 wherein said connecting means comprising a carrier driving clutch connected between said input member and said common carrier, a ring gear driving clutch connected between said input member and one of said ring gears, a first sun gear holding brake connected between said housing member and said first sun gear, a second sun gear holding brake connected between said housing member and said second sun gear, and a carrier holding brake connected between said housing member and said common carrier.

38. A planetary gear system comprising:
first and second ring gears;
first and second sun gears;
first and second planet carriers integrated into a single common planet carrier;
a pinion means comprising a planet pinion set which is a set of planet pinions rotatably mounted on said common carriers, said planet pinion set comprising first and second side pinions which are integrated into a single long pinion, said first ring gear and said first sun gear being geared by a first pinion subset which is a subset of said planet pinion set so that a first planetary gear train is formed by said first ring gear, said first sun gear and said first pinion subset, said second ring gear and said second sun gear being geared by a second pinion subset which is a subset of said planet pinion set so that a second planet gear train is formed by said second ring gear, said second sun gear and said second pinion subset which is a subset of said planet pinion set so that a second planet gear train is formed by said second ring gear, said second sun gear and said second pinion subset, said first and second ring gears being geared by a third pinion subset which is a subset of said planet pinion set so that a third planetary gear train is formed by said third pinion subset and said first and second ring gears;
wherein said first ring gear, said first sun gear, said second ring gear, said second sun gear and said common carrier form, respectively, a rotary first ring gear member, a rotary first sun gear member, a rotary second ring gear member, a rotary second sun gear member and a rotary carrier member which can rotate relative to one another;
wherein said gear system further comprises an input member for receiving an input rotation, an output member for delivering an output rotation, a stationary housing member and a connecting means for connecting each of said rotary members with one of said input, output and housing members, said connecting means comprises a first clutch; and
wherein one of said first and second ring gears is an output ring gear which is connected with said output member, and the other of said first and second ring gears is an input ring gear which is connected with said input member through said first clutch of said connecting means.

39. A planetary gear system according to claim 38 wherein said input member includes an input shaft, and said output member includes an output shaft which is in alignment with said input shaft, said first ring gear is connected with said output shaft, so that the output ring gear is said first ring gear and the inputting gear is said second ring gear, and said planet pinion set comprises an outer first short pinion which is geared between said first ring gear and said long pinion, and an inner second short pinion which is geared between said long pinion and said second sun gear, said first side pinion of said long pinion is geared between said first short pinion and said first sun gear, and said second side pinion of said long pinion is geared between said second ring gear and said second short pinion.

40. A planetary gear system according to claim 39 wherein said connecting means comprising a carrier driving clutch connected between said input member and said common carrier, a ring gear driving clutch connected between said input member and one of said ring gears, a sun gear driving clutch connected between said input member and one of said sun gears, a first sun gear holding brake connected between said housing member and said first sun gear, a second sun gear holding brake connected between said housing member and said second sun gear, and a carrier holding brake connected between said housing member and said common carrier.

41. A planetary gear system according to claim 40 wherein said first and second sun gears are geared by a fourth pinion subset which is a subset of said planet pinion set so that a fourth planetary gear train is formed by said fourth pinion subset and said first and second sun gears, said first and second side pinions of said long pinion being both included in each of said third and fourth pinion subsets.

42. A planetary gear system according to claim 41 wherein each of said first, second, third and fourth gear trains is a series of successively engaged gears including only two of said first and second ring gears and said first and second sun gears, and at least one planet pinion rotatably mounted on said common carrier.

43. A planetary gear system according to claim 42 wherein said first side pinion of said long pinion is in direct engagement with at least one toothed component of said first planetary gear train, an said second side pinion of said long pinion is in direct engagement with at least one toothed component of said second planetary gear train.

44. A planetary gear system according to claim 43 wherein said first ring gear is geared with said second sun gear by a fifth pinion subset which is a subset of said planet pinion set so that a fifth planetary gear train is formed by said first ring gear and said second sun gear and said fifth pinion subset, and said second ring gear is geared with said first sun gear by a sixth pinion subset which is a subset of said planet pinion set so that a sixth planetary gear train is formed by said second ring gear, said first sun gear and said sixth pinion subset, and first and second side pinions of said long pinion being both included in each of said fifth pinion subsets.

45. A planetary gear system according to claim 44 wherein said first and second ring gears and said first and second sun gears are all coaxial with one another, and all disposed axially between first and second imaginary planes which are axially spaced from each other along a common axis of said first and second ring gears and said first and second sun gears, said first ring being disposed axially between said first plane and said second ring gear, said first sun gear being disposed axially between said first plane and said second sun gear, said second ring gear being disposed axially between said first ring gear and said second plane, and said second sun gear being disposed axially between said first sun gear and said second plane.

46. A planetary gear system according to claim 38 wherein said pinion means further comprises a short pinion which meshes with both said second ring gear and said second sun gear, and wherein said first portion of said long pinion meshes with both said first ring gear and said first sun gear, and said second portion of said long pinion meshes with said short pinion.

47. A planetary gear system according to claim 46 wherein the number of teeth of said first portion of said long pinion is different from that of said second portion of said long pinion.

48. A planetary gear system according to claim 38 wherein said pinion means comprises a short pinion meshing with said second ring gear, said first portion of said long pinion meshing with both said first ring gear and said first sun gear, and said second portion of said long pinion meshing with both said short pinion and said second sun gear, the number of teeth of said first portion of said long pinion being different from that of said second portion.

49. A planetary gear system according to claim 38 wherein said pinion means further comprises a first short pinion meshing with both said first ring gear and said first sun gear, and a second short pinion meshing with said second sun gear, said first portion of said long pinion meshing with said first short pinion, and said second portion of said long pinion meshing with both said second ring gear and said second short pinion.

50. A planetary gear system comprising:
first and second ring gears;
first and second sun gears;
first and second planet carriers integrated into a single common planet carrier;
a pinion means comprising a planet pinion set which is a set of planet pinions rotatably mounted on said common carriers, said planet pinion set comprising first and second side pinions which are integrated into a single long pinion, said first ring gear and said first sun gear being geared by a first pinion subset which is a subset of said planet pinion set so that a first planetary gear train is formed by said first ring gear, said first sun gear and said first pinion subset, said second ring gear and said second sun gear being geared by a second pinion subset which is a subset of said planet pinion set so that a second planet gear train is formed by said second ring gear, said second sun gear and said second pinion subset, said first and second ring gears being geared by a third pinion subset which is a subset of said planet pinion set so that a third planetary gear train s formed by said third pinion subset and said first and second ring gears,
wherein said first ring gear, said first sun gear, said second ring gear, said second sun gear and said common carrier form, respectively, a rotary first ring gear member, a rotary first sun gear member, a rotary second ring gear member, a rotary second sun gear member and a rotary carrier member which can rotate relative to one another;
wherein said gear system further comprises an input member for receiving an input rotation, an output member for delivering an output rotation, a stationary housing member, and a connecting means for connecting each of said rotary members with one of said input, output and housing members;
wherein one of said first and second ring gears is an output ring gear which is connected with said output member; and
wherein said first and second sun gears are placed between first and second imaginary planes which are both perpendicular to a common axis of said first and second sun gears, and which are spaced from each other along said common axis, said first plane being located between one end of said input member and said sun gears, said second imaginary plane being spaced from said input member, one of said first and second sun gears being a remoter sun gear which is remoter from said first imaginary plane than the other of said first and second sun gears, said planet pinion set comprising a remoter inner short pinion which is in direct engagement with the remoter sun gear.

51. A planetary gear system according to claim 40 wherein said pinion means further comprises a first short pinion meshing with said first sun gear, and a second short pinion meshing with said second sun gear, said first portion of said long pinion meshing with both said first ring gear and said first short pinion, and said second portion of said long pinion meshing with both said second ring gear and said second short pinion, the number of teeth of said first portion of said long pinion being different from that of said second portion.

52. A planetary gear system according to claim 40 wherein said pinion means further comprises an outer first short pinion meshing with said first ring gear, an inner first short pinion meshing with both said outer short pinion and said first sun gear, and a second short pinion meshing with said second ring gear, said first portion of said long pinion meshing with said outer first short pinion, and said second portion of said long pinion meshing with both said second short pinion and said second sun gear.

53. A planetary gear system according to claim 50 wherein said pinion means further comprises a first short pinion meshing with said first sun gear, and a second short pinion meshing with said second sun gear, said first portion of said long pinion meshing with both said first ring gear and said first short pinion, and said second portion of said long pinion meshing with both said second ring gear and said second short pinion, the number of teeth of said first portion of said long pinion being different from that of said second portion.

54. A planetary gear system comprising:
first and second ring gears;
first and second sun gears;
first and second planet carriers integrated into a single common planet carrier;
a pinion means comprising a planet pinion set which is a set of planet pinions rotatably mounted on said common carriers, said planet pinion set comprising first and second side pinions which are integrated into a single long pinion, said first ring gear and said first sun gear being geared by a first pinion subset which is a subset of said planet pinion set so that a first planetary gear train is formed by said first ring gear, said first sun gear and said first pinion subset, said second ring gear and said second sun gear being geared by a second pinion subset which is a subset of said planet pinion set so that a second planet gear train is formed by said second ring gear, said second sun gear and said second pinion subset, said first and second ring gears being geared by a third pinion subset which is a subset of said planet pinion set so that a third planetary gear train s formed by said third pinion subset and said first and second ring gears,
wherein said first ring gear, said first sun gear, said second ring gear, said second sun gear and said common carrier form, respectively, a rotary first ring gear member, a rotary first sun gear member, a rotary second ring gear member, a rotary second sun gear member and a rotary carrier member which can rotate relative to one another;

wherein said gear system further comprises an input member for receiving an input rotation, an output member for delivering an output rotation, a stationary housing member, and a connecting means for connecting each of said rotary members with one of said input, output and housing members;

wherein one of said first and second ring gears is an output ring gear which is connected with said output member;

wherein said first and second sun gears are placed between first and second imaginary planes which are both perpendicular to a common axis of said first and second sun gears, and which are spaced from each other along said common axis, said first plane being located between one end of said input member and said ring gears, said second imaginary plane being spaced from said input member, one of said first and second ring gears being a closer ring gear which is closer to said first imaginary plane than the other of said first and second ring gears, said planet pinion set comprising a closer outer short pinion which is in direct engagement with the closer ring gear.

55. A planetary gear system according to claim 54 wherein said planet pinion set comprises a second short pinion which is in direct engagement with one of said sun gears.

56. A planetary gear system according to claim 54 wherein said connecting means includes a means for putting said rotary members in an overdrive state to provide an overdrive speed ration in which an output speed is greater than an input speed, one of said first and second planetary gear trains is a single pinion type planetary gear train, and said third planetary gear train is a double pinion type planetary gear train.

57. A planetary gear system according to claim 54 wherein said first and second sun gears are geared by a fourth pinion subset which is a subset of said planet pinion set so that a fourth planetary gear train is formed by said fourth pinion subset and said first and second sun gears, said first and second side pinions of said long pinion being both included in each of said third and fourth pinion subsets; wherein each of said first, second, third and fourth gear trains is a series of successively engaged gears including only two of said first and second ring gears and said first and second sun gears, and at least one planet pinion rotatably mounted on said common carrier, wherein said first side pinion of said long pinion is in direct engagement with at least one toothed component of said first planetary gear train, and said second side pinion of said long pinion is in direct engagement with at least one toothed component of said second planetary gear train.

58. A planetary gear system according to claim 57 wherein said first side pinion of said long pinion belongs to a first side subset which is a subset of said planet pinion set, and said second side pinion belongs to a second side subset which is a complement of said first side subset in said planet pinion set, said first side subset being a union of said first pinion subset and a first additional subset which are disjointed so that said first pinion subset and said first additional subset have no elements in common, said second side subset being a union of said second pinion subset and a second additional subset which are disjointed so that said second pinion subset and said second additional subset have no elements in common, each of said first and second additional subsets being a subset of said planet pinion set and having a cardinal number which is equal to or smaller than one, the cardinal number of said first side subset being equal to one only when said first side pinion is not included in said first pinion subset, and the cardinal number of said first side subset being equal to one only when said first side pinion is not included in said first pinion subset, and the cardinal number of said second subset being equal to one only when said second side pinion is not included in said second pinion subset.

59. A planetary gear system according to claim 58 wherein the element of said first additional subset is out of direct engagement with each of said first ring gear and said first sun gear if the cardinal number of said first additional subset is equal to one, and the element of said second additional subset is out of direct engagement with each of said second ring gear and said second sun gear if the cardinal number of said second additional subset is equal to one.

60. A planetary gear system according to claim 58 wherein said first additional subset is a one element subset including only one element which is out of direct engagement with each of said first ring gear and said first sun gear, and said second additional subset is one element subset including only one element which is out of direct engagement with each of said second ring gear and said second sun gear.

61. A planetary gear system according to claim 54 wherein said first portion of said long pinion meshes with both said first ring gear and said first sun gear, and said second portion of said long pinion meshes with both said second ring gear and said second sun gear, the numbers of teeth of said first an second portions of said long pinion being different from each other.

62. A planetary gear system comprising:
first and second ring gears;
first and second sun gears;
first and second planet carriers integrated into a single common planet carrier;
a pinion means comprising a planet pinion set which is a set of planet pinions rotatably mounted on said common carriers, said planet pinion set comprising first and second side pinions which are integrated into a single long pinion, said first ring gear and said first sun gear being geared by a first pinion subset which is a subset of said planet pinion set so that a first planetary gear train is formed by said first ring gear, said first sun gear and said first pinion subset, said second ring gear and said second sun gear being geared by a second pinion subset which is a subset of said planet pinion set so that a second planet gear train is formed by said second ring gear, said second sun gear and said second pinion subset, said first and second ring gears being geared by a third pinion subset which is a subset of said planet pinion set so that a third planetary gear train s formed by said third pinion subset and said first and second ring gears, wherein said first ring gear, said first sun gear, said second ring gear, said second sun gear and said common carrier form, respectively, a rotary first ring gear member, a rotary first sun gear member, a rotary second ring gear member, a rotary second sun gear member and a rotary carrier member which can rotate relative to one another;

wherein said gear system further comprises an input member for receiving an input rotation, an output member for delivering an output rotation, a stationary housing member, and a connecting means for connecting each of said rotary members with one of said input, output and housing members;

wherein one of said first and second ring gears is an input ring gear, and the other of said first and second ring gears is a remaining ring gear, said connecting means comprising a first clutch, said input ring gear being connected with said input member through said first clutch;

wherein said planet pinion comprising an outer short pinion which is in direct engagement with said remaining ring gear, and a second short pinion.

63. A planetary gear system according to claim 62 wherein one of said first and second sun gears is an input side sun gear, and the other of said first and second sun gears is an opposite side sun gear, and wherein said second short pinion is connected between said input ring gear and said input side sun gear, said second short pinion is in direct engagement with said input side sun gear, and said long pinion is in direct engagement with both of said out short pinion and said opposite side sun gear.

64. A planetary gear system according to claim 62 wherein said pinion means further comprises a short pinion meshing with said second sun gear, said first portion of said long pinion meshing with both said first ring gear and said first sun gear, and said second portion of said long pinion meshing with both said second ring gear and said short pinion, the number of said first portion of said long pinion being different from that of said second portion.

65. A planetary gear system according to claim 62 wherein said pinion means further comprises a first short pinion meshing with both said first ring gear and said first sun gear, and a second short pinion meshing with said second ring gear, said first portion of said long pinion meshing with said first short pinion, and said second portion of said long pinion meshing with both said second short pinion and said second sun gear.

* * * * *